(12) United States Patent
Wu et al.

(10) Patent No.: US 11,128,364 B2
(45) Date of Patent: Sep. 21, 2021

(54) METHOD AND DEVICE FOR WIRELESS COMMUNICATION IN UE AND BASE STATION

(71) Applicant: SHANGHAI LANGBO COMMUNICATION TECHNOLOGY COMPANY LIMITED, Shanghai (CN)

(72) Inventors: KeYing Wu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/835,352

(22) Filed: Mar. 31, 2020

(65) Prior Publication Data
US 2020/0228181 A1    Jul. 16, 2020

Related U.S. Application Data

(63) Continuation of application No. PCT/CN2019/092793, filed on Jun. 25, 2019.

(51) Int. Cl.
*H04B 7/06* (2006.01)
*H04B 7/08* (2006.01)
*H04L 5/00* (2006.01)

(52) U.S. Cl.
CPC ......... *H04B 7/0634* (2013.01); *H04B 7/0663* (2013.01); *H04B 7/0865* (2013.01); *H04L 5/0051* (2013.01)

(58) Field of Classification Search
CPC .. H04B 7/0634; H04B 7/0663; H04B 7/0865; H04B 7/0478; H04L 5/0051;
(Continued)

(56) References Cited

U.S. PATENT DOCUMENTS

| 10,171,153 B2 * | 1/2019 | Kim ..................... H04B 7/0626 |
| 2012/0014462 A1 * | 1/2012 | Zummo ................ H04W 52/42 375/260 |

(Continued)

FOREIGN PATENT DOCUMENTS

| CN | 104753646 A | 7/2015 |
| CN | 105577318 A | 5/2016 |

OTHER PUBLICATIONS

ISR received in application No. PCT/CN2019/092793 dated Sep. 2, 2019.

(Continued)

*Primary Examiner* — Hashim S Bhatti
(74) *Attorney, Agent, or Firm* — Maschoff Brennan

(57) ABSTRACT

The present disclosure discloses a method and device for wireless communication in a user equipment and base station. The user equipment receives first information and sends first radio signal. The first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R (greater than R3) and R3 are positive integers.

20 Claims, 25 Drawing Sheets

(58) Field of Classification Search
CPC ............... H04L 5/0094; H04L 5/0007; H04W 72/0413; H04W 72/042; H04W 74/0808; H04W 72/0446; H04W 72/0453; H04W 72/085; H04W 72/1289
See application file for complete search history.

(56) References Cited

U.S. PATENT DOCUMENTS

2015/0289155 A1* 10/2015 Gao ..................... H04L 5/0057
370/252
2019/0364546 A1* 11/2019 Kwak ................. H04W 72/042

OTHER PUBLICATIONS

3GPP "NR Physical Layer Procedures for Data" 3GPP TS 38.214 V15.1.0, Apr. 9, 2018, section 5.2.

* cited by examiner $$P \text{ candidate integers} =$$
$$\{\text{First candidate integer}, \quad \text{Second candidate integer}\}$$

$$L = \begin{cases} \text{First candidate integer}, \\ R \leq \text{First rank threshold} \\ \\ \text{Second candidate integer}, \\ R > \text{First rank threshold} \end{cases}$$

FIG. 6

Second type parameter group #i = { Second type parameter #(i,0),..., 1, ..., Second type parameter #(i,L2-1) }   $0 \leq i < R$

FIG. 8

METHOD AND DEVICE FOR WIRELESS COMMUNICATION IN UE AND BASE STATION

CROSS-REFERENCE TO RELATED APPLICATION

This application is a continuation of International Application No. PCT/CN2019/092793, filed on Jun. 25, 2019, claiming the priority benefit of Chinese Application No. 201810693236.6, filed on Jun. 29, 2018, the full disclosure of which is incorporated herein by reference.

BACKGROUND

Technical Field

The present disclosure relates to a method and device in a wireless communication system, particularly to a method and device in a wireless communication system that supports uplink channel state information feedback.

Related Art

In a wireless communication system that supports multi-antenna transmission, it is a common technique for a UE (User Equipment) to feedback CSI (Channel Status Information) to assist the base station in performing multi-antenna processing. In the traditional 3GPP-3rd Generation Partner Project cellular network system, the implicit CSI (Channel State Information) feedback is supported. The implicit CSI includes CRI (CSI-RS Resource Indicator), RI (Rank Indicator), PMI (Precoding Matrix Indicator), CQI (Channel Quality Indicator), and etc. As the quantity of antenna equipped on the base station side increases, the accuracy of implicit CSI is difficult to meet the demand for multi-antenna technology such as MU-MIMO (multi-user multiple input multiple output) transmission. Therefore, the 3GPP R (Release, version) 14 began the research on enhancing CSI. Type I CSI feedback and Type II (second type) CSI feedback are simultaneously used in the 3GPP R15.

In the Type II CSI feedback of the R15 version, the UE feeds back a plurality of mutually orthogonal beams and corresponding coefficients, and the beams are added to each other after weighted by coefficients in the base station to restore the estimation of the channel, where generally the Type II CSI feedback requires a large overhead. In the R15 version, the Type II CSI feedback comprises two parts: CSI Part 1 and CSI Part 2. The overhead of CSI Part 2 is determined by CSI Part 1, and the base station cannot accurately predict in advance. When the allocated resources are insufficient to feed back the contents of all CSI Part 2, some of the feedback of the narrow-band coefficients will be discarded. In the current scheme, all layers on one sub-band and narrow-band coefficients on all beams are fed back or discarded together.

SUMMARY

In the R15 version, the Type II CSI feedback only supports up to 2 layers and 4 beams. In the R16 version, since the number of receiving antennas at the UE side can be up to eight, the maximum number of layers supported may be further increased. As the number of layers increases above 2, the number of beams required also needs to increase. When the number of layers exceeds 2 and the number of beams exceeds 4, the overhead of Type II CSI feedback will further increase. The existing feedback schemes need to be further enhanced to achieve the best compromise between performance and feedback overhead.

In response to the above problems, the present disclosure provides a solution. It should be noted that, when there is no repelling between the features of the embodiment and the embodiment of the user equipment of the present disclosure, they can be applied to the base station, and vice versa. The features of the embodiments and the embodiments of the present disclosure can be combined with each other under non-repelling conditions.

The present disclosure discloses a method for wireless communication in a user equipment (UE), comprising:
 receiving first information; and
 transmitting a first radio signal;
 wherein the first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

In one sub-embodiment, the problem to be is that how to control the overhead of Type II CSI feedback when the maximum supported number of layers exceeds 2. The above method solves this problem by determining the number of feedback beams based on the number of layers actually fed back.

In one sub-embodiment, the feature of the foregoing method is that the number of feedback beams is dynamically selected according to the number of layers fed back. When the number of layers fed back is not greater than a certain threshold, a small amount of beam is fed back; when the number of layers fed back is greater than a certain threshold, more beams are fed back.

In one sub-embodiment, the foregoing method has the advantages that the number of feedback beams is selected according to actual requirements, improving the feedback efficiency and the feedback overhead is reduced while the performance is ensured.

According to one aspect of the present disclosure, the first bit block is used to determine R1 third type parameter subgroup(s); the R1 third type parameter subgroup(s) is(are) respectively a subset(subsets) of R1 third type parameter group(s) in R third type parameter group(s); the R1 is a positive integer not greater than the R; each of the R third type parameter group(s) comprises a positive integer number of third type parameters; each third type parameter of the R third type parameter group(s) corresponds to one second type parameter of the R second type parameter group(s); whether a reference third type parameter belongs to the R1 third type parameter subgroup(s) is associated with at least one of an index of a reference third type parameter group in the R third type parameter group(s) and a magnitude of a second type parameter corresponding to the reference third type parameter; the reference third type parameter is any third type parameter of the R third type parameter group(s); the reference third type parameter group is a third type parameter group comprising the reference third type parameter in the R third type parameter group(s).

In one sub-embodiment, the foregoing method has the advantages that for each sub-band, a part of the most important layer and a narrow band coefficient on the beam can be selectively fed back instead of fully feedback or abandon feedback of all narrow band coefficients on a sub-band as in the current scheme. This method can control the relationship between performance and feedback overhead with more flexibly to achieve a better compromise between performance and feedback overhead.

According to one aspect of the present disclosure, wherein the R third type parameter group(s) and the R second type parameter group(s) are in one-to-one correspondence; a number of third type parameters included in any one of the R third type parameter group(s) is equal to a number of non-zero second type parameters in a corresponding second type parameter group; all the third type parameters in any one of the R third type parameter group(s) and all the non-zero second type parameters in the corresponding second type parameter group are in one-to-one correspondence.

According to one aspect of the present disclosure, wherein the first bit block is used to determine R2 fourth type parameter subgroup(s), the R2 fourth type parameter subgroup(s) is(are) respectively a subset(subsets) of R2 fourth type parameter group(s) in R fourth type parameter group(s), the R2 is a positive integer not greater than the R, each of the R fourth type parameter group(s) comprises a positive integer number of fourth type parameters, each fourth type parameter of the R fourth type parameter group(s) corresponds to one second type parameter of the R second type parameter group(s), whether a reference fourth type parameter belongs to the R2 fourth type parameter subgroup(s) is associated with at least one of an index of a reference fourth type parameter group in the R fourth type parameter group(s) and a magnitude of a second type parameter corresponding to the reference fourth type parameter, the reference fourth type parameter is any fourth type parameter of the R fourth type parameter group(s), the reference fourth type parameter group is a fourth type parameter group comprising the reference fourth type parameter in the R fourth type parameter group(s).

According to one aspect of the present disclosure, wherein the R fourth type parameter group(s) and the R second type parameter group(s) are in one-to-one correspondence; a number of fourth type parameters included in any one of the R fourth type parameter group(s) is equal to a number of non-zero second type parameters in a corresponding second type parameter group, all the fourth type parameters in any one of the R fourth type parameter group(s) and all the non-zero second type parameters in the corresponding second type parameter group are in one-to-one correspondence.

According to one aspect of the present disclosure, comprising:
receiving a first signaling;
wherein the first signaling indicates scheduling information of the first radio signal.

According to one aspect of the present disclosure, comprising:
receiving a first reference signal;
wherein a measurement for the first reference signal is used to determine the first bit block.

According to one aspect of the present disclosure, comprising:
receiving a second radio signal;
wherein the R3 merge vector is used to generate the second radio signal with the R3 being 1, or some or all of the R3 merge vectors are used to generate the second radio signal with the R3 being larger than 1.

The present disclosure discloses a method for wireless communication in a base station, comprising:
transmitting first information;
receiving a first radio signal;
wherein the first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

According to one aspect of the present disclosure, wherein the first bit block is used to determine R1 third type parameter subgroup(s); the R1 third type parameter subgroup(s) is(are) respectively a subset(subsets) of R1 third type parameter group(s) in R third type parameter group(s); the R1 is a positive integer not greater than the R; each of the R third type parameter group(s) comprises a positive integer number of third type parameters; each third type parameter of the R third type parameter group(s) corresponds to one second type parameter of the R second type parameter group(s); whether a reference third type parameter belongs to the R1 third type parameter subgroup(s) is associated with at least one of an index of a reference third type parameter group in the R third type parameter group(s) and a magnitude of a second type parameter corresponding to the reference third type parameter; the reference third type parameter is any third type parameter of the R third type parameter group(s); the reference third type parameter group is a third type parameter group comprising the reference third type parameter in the R third type parameter group(s).

According to one aspect of the present disclosure, wherein the R third type parameter group(s) and the R second type parameter group(s) are in one-to-one correspondence; a number of third type parameters included in any one of the R third type parameter group(s) is equal to a number of non-zero second type parameters in a corresponding second type parameter group; all the third type parameters in any one of the R third type parameter group(s) and all the non-zero second type parameters in the corresponding second type parameter group are in one-to-one correspondence.

According to one aspect of the present disclosure, wherein the first bit block is used to determine R2 fourth type parameter subgroup(s), the R2 fourth type parameter subgroup(s) is(are) respectively a subset(subsets) of R2 fourth type parameter group(s) in R fourth type parameter group(s), the R2 is a positive integer not greater than the R, each of the R fourth type parameter group(s) comprises a positive integer number of fourth type parameters, each fourth type parameter of the R fourth type parameter group(s) corresponds to one second type parameter of the R second type parameter group(s), whether a reference fourth type parameter belongs to the R2 fourth type parameter subgroup(s) is associated with at least one of an index of a reference fourth type parameter group in the R fourth type parameter group(s) and a magnitude of a second type parameter corresponding to the reference fourth type parameter, the reference fourth type parameter is any fourth type parameter of the R fourth type parameter group(s), the reference fourth type parameter group is a fourth type parameter group comprising the reference fourth type parameter in the R fourth type parameter group(s).

According to one aspect of the present disclosure, wherein the R fourth type parameter group(s) and the R second type parameter group(s) are in one-to-one correspondence, a number of fourth type parameters included in any one of the R fourth type parameter group(s) is equal to a number of non-zero second type parameters in a corresponding second type parameter group, all the fourth type parameters in any one of the R fourth type parameter group(s) and all the non-zero second type parameters in the corresponding second type parameter group are in one-to-one correspondence.

According to one aspect of the present disclosure, comprising:

transmitting a first signaling;

wherein the first signaling indicates scheduling information of the first radio signal.

According to one aspect of the present disclosure, comprising:

transmitting a first reference signal;

wherein a measurement for the first reference signal is used to determine the first bit block.

According to one aspect of the present disclosure, comprising:

transmitting a second radio signal;

wherein the R3 merge vector is used to generate the second radio signal with the R3 being 1, or some or all of the R3 merge vectors are used to generate the second radio signal with the R3 being larger than 1.

The present disclosure discloses a user equipment (UE) for wireless communication, comprising:

a first receiver, receiving first information;

a first transmitter, transmitting a first radio signal;

wherein the first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

In one sub-embodiment, the feature of the above user equipment for wireless communication is that the first bit block is used to determine R1 third type parameter subgroup(s); the R1 third type parameter subgroup(s) is(are) respectively a subset(subsets) of R1 third type parameter group(s) in R third type parameter group(s); the R1 is a positive integer not greater than the R; each of the R third type parameter group(s) comprises a positive integer number of third type parameters; each third type parameter of the R third type parameter group(s) corresponds to one second type parameter of the R second type parameter group(s); whether a reference third type parameter belongs to the R1 third type parameter subgroup(s) is associated with at least one of an index of a reference third type parameter group in the R third type parameter group(s) and a magnitude of a second type parameter corresponding to the reference third type parameter; the reference third type parameter is any third type parameter of the R third type parameter group(s); the reference third type parameter group is a third type parameter group comprising the reference third type parameter in the R third type parameter group(s).

In one sub-embodiment, the feature of the above user equipment for wireless communication is that the R third type parameter group(s) and the R second type parameter group(s) are in one-to-one correspondence; a number of third type parameters included in any one of the R third type parameter group(s) is equal to a number of non-zero second type parameters in a corresponding second type parameter group; all the third type parameters in any one of the R third type parameter group(s) and all the non-zero second type parameters in the corresponding second type parameter group are in one-to-one correspondence.

In one sub-embodiment, the feature of the above user equipment for wireless communication is that the first bit block is used to determine R2 fourth type parameter subgroup(s), the R2 fourth type parameter subgroup(s) is(are) respectively a subset(subsets) of R2 fourth type parameter group(s) in R fourth type parameter group(s), the R2 is a positive integer not greater than the R, each of the R fourth type parameter group(s) comprises a positive integer number of fourth type parameters, each fourth type parameter of the R fourth type parameter group(s) corresponds to one second type parameter of the R second type parameter group(s), whether a reference fourth type parameter belongs to the R2 fourth type parameter subgroup(s) is associated with at least one of an index of a reference fourth type parameter group in the R fourth type parameter group(s) and a magnitude of a second type parameter corresponding to the reference fourth type parameter, the reference fourth type parameter is any fourth type parameter of the R fourth type parameter group(s), the reference fourth type parameter group is a fourth type parameter group comprising the reference fourth type parameter in the R fourth type parameter group(s).

In one sub-embodiment, the feature of the above user equipment for wireless communication is that the R fourth type parameter group(s) and the R second type parameter group(s) are in one-to-one correspondence, a number of fourth type parameters included in any one of the R fourth type parameter group(s) is equal to a number of non-zero second type parameters in a corresponding second type parameter group, all the fourth type parameters in any one of the R fourth type parameter group(s) and all the non-zero second type parameters in the corresponding second type parameter group are in one-to-one correspondence.

In one sub-embodiment, the feature of the above user equipment for wireless communication is that the first receiver further receives a first signaling, wherein the first signaling indicates scheduling information of the first radio signal.

In one sub-embodiment, the feature of the above user equipment for wireless communication is that the first receiver further receives a first reference signal, wherein a measurement for the first reference signal is used to determine the first bit block.

In one sub-embodiment, the feature of the above user equipment for wireless communication is that the first receiver further receives a second radio signal, wherein the R3 merge vector is used to generate the second radio signal with the R3 being 1, or some or all of the R3 merge vectors are used to generate the second radio signal with the R3 being larger than 1.

The present disclosure discloses a base station for wireless communication, comprising:

a second transmitter, transmitting first information;

a second receiver, receiving a first radio signal;

wherein the first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

In one sub-embodiment, the feature of the above base station for wireless communication is that the first bit block is used to determine R1 third type parameter subgroup(s); the R1 third type parameter subgroup(s) is(are) respectively a subset(subsets) of R1 third type parameter group(s) in R third type parameter group(s); the R1 is a positive integer not greater than the R; each of the R third type parameter group(s) comprises a positive integer number of third type parameters; each third type parameter of the R third type parameter group(s) corresponds to one second type parameter of the R second type parameter group(s); whether a reference third type parameter belongs to the R1 third type parameter subgroup(s) is associated with at least one of an index of a reference third type parameter group in the R third type parameter group(s) and a magnitude of a second type parameter corresponding to the reference third type parameter; the reference third type parameter is any third type parameter of the R third type parameter group(s); the reference third type parameter group is a third type parameter group comprising the reference third type parameter in the R third type parameter group(s).

In one sub-embodiment, the feature of the above base station for wireless communication is that the R third type parameter group(s) and the R second type parameter group(s) are in one-to-one correspondence; a number of third type parameters included in any one of the R third type parameter group(s) is equal to a number of non-zero second type parameters in a corresponding second type parameter group; all the third type parameters in any one of the R third type parameter group(s) and all the non-zero second type parameters in the corresponding second type parameter group are in one-to-one correspondence.

In one sub-embodiment, the feature of the above base station for wireless communication is that the first bit block is used to determine R2 fourth type parameter subgroup(s), the R2 fourth type parameter subgroup(s) is(are) respectively a subset(subsets) of R2 fourth type parameter group(s) in R fourth type parameter group(s), the R2 is a positive integer not greater than the R, each of the R fourth type parameter group(s) comprises a positive integer number of fourth type parameters, each fourth type parameter of the R fourth type parameter group(s) corresponds to one second type parameter of the R second type parameter group(s), whether a reference fourth type parameter belongs to the R2 fourth type parameter subgroup(s) is associated with at least one of an index of a reference fourth type parameter group in the R fourth type parameter group(s) and a magnitude of a second type parameter corresponding to the reference fourth type parameter, the reference fourth type parameter is any fourth type parameter of the R fourth type parameter group(s), the reference fourth type parameter group is a fourth type parameter group comprising the reference fourth type parameter in the R fourth type parameter group(s).

In one sub-embodiment, the feature of the above base station for wireless communication is that the R fourth type parameter group(s) and the R second type parameter group(s) are in one-to-one correspondence, a number of fourth type parameters included in any one of the R fourth type parameter group(s) is equal to a number of non-zero second type parameters in a corresponding second type parameter group, all the fourth type parameters in any one of the R fourth type parameter group(s) and all the non-zero second type parameters in the corresponding second type parameter group are in one-to-one correspondence.

In one sub-embodiment, the feature of the above base station for wireless communication is that the second transmitter further transmits a first signaling, wherein the first signaling indicates scheduling information of the first radio signal.

In one sub-embodiment, the feature of the above base station for wireless communication is that the second transmitter further transmits a first reference signal, wherein a measurement for the first reference signal is used to determine the first bit block.

In one sub-embodiment, the feature of the above base station for wireless communication is that the second transmitter further transmits a second radio signal, wherein the R3 merge vector is used to generate the second radio signal with the R3 being 1, or some or all of the R3 merge vectors are used to generate the second radio signal with the R3 being larger than 1.

In one sub-embodiment, the present disclosure has the following advantages compared with the conventional solution:

In Type II CSI feedback, the number of feedback beams is dynamically selected according to the number of layers fed back; That is to avoid the waste of resources caused by too many beams fed back when the number of layers is small, and to avoid the performance loss caused by feedback of insufficient beams fed back when the number of layers is large. This improves feedback efficiency and reduces feedback overhead while maintaining performance.

For each sub-band, it is possible to selectively feedback some of the most important layers and narrow-band coefficients on the beam; In this way, the relationship between performance and feedback overhead can be more flexibly controlled to achieve the best balance between them.

BRIEF DESCRIPTION OF THE DRAWINGS

Other features, objects, and advantages of the present disclosure will become more apparent from the detailed description of the accompanying drawings.

FIG. 6 is a schematic diagram of R being used to determine L from P candidate integers in accordance with one embodiment of the present disclosure;

FIG. 8 is a schematic diagram of R second type parameter group(s) in accordance with one embodiment of the present disclosure;

DESCRIPTION OF THE EMBODIMENTS

The embodiments of the present disclosure will be further described in detail below with reference to the accompanying drawings, and it should be noted that the features in the embodiments and the embodiments of the present disclosure may be combined with each other without conflict.

Embodiment 1

Figure 1:
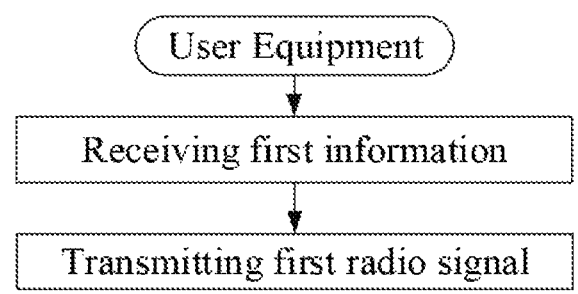
FIG. 1 is a flow chart of first information and first radio signal according to one embodiment of the present disclosure.

Embodiment 1 illustrates a flow chart of a first information and a first radio signal, as shown in FIG. 1.

In Embodiment 1, the user equipment in the disclosure receives the first information, and transmits the first radio signal. Wherein the first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

In one sub-embodiment, the first information is carried by high level signaling.

In one sub-embodiment, the first information is carried by RRC (Radio Resource Control) signaling.

In one sub-embodiment, the first information is carried by a MAC CE (Medium Access Control Layer Control Element) signaling.

In one sub-embodiment, the first information is UE-specific.

In one sub-embodiment, the first information indicates the P candidate integers.

In one sub-embodiment, the first information explicitly indicates the P candidate integers.

In one sub-embodiment, the first bit block includes a positive integer number of bits.

In one sub-embodiment, the bits in the first bit block are sequentially arranged.

In one sub-embodiment, the first bit block carries UCI (Uplink Control Information).

In one sub-embodiment, the first bit block carries CSI (Channel State Information).

As a sub-embodiment of the above embodiment, the CSI comprises one or more of CRI (Channel-state information reference signals Resource Indicator), SSB (Synchronization Signal Block) index, R1 (Rank Indicator), CQI (Channel Quality Indicator), PMI (Precoding Matrix Indicator), Indicator of the number of non-zero wideband amplitude coefficients, RSRP (Reference Signal Received Power), and Layer Indicator.

In one sub-embodiment, the first bit block carries Type II (second type) CSI, and the specific content of the Type II CSI is described in section 5.2.2 of 3GPP TS38.214 (V15.1.0).

In one sub-embodiment, the first bit block carries a Type II (second type) codebook based PMI, and the specific content of the Type II codebook based PMI is described in section 5.2.2.2 of 3GPP TS 38.214 (V15.1.0).

In one sub-embodiment, the first bit block carries a PMI based on a Type II (second type) port selection codebook, and the specific content of the PMI based on the Type II port selection codebook is referred to section 5.2.2.2 of 3GPP TS38.214 (V15.1.0).

In one sub-embodiment, the first radio signal carries a second bit block, and the second bit block comprises uplink data.

In one sub-embodiment, the first bit block indicates the R and the L first vector(s), and the R second type parameter group(s).

In one sub-embodiment, the first bit block explicitly indicates the R.

In one sub-embodiment, the first bit block explicitly indicates the L first vector(s).

In one sub-embodiment, the first bit block explicitly indicates the R second type parameter group(s).

In one sub-embodiment, the first bit block implicitly indicates the R.

In one sub-embodiment, the first bit block implicitly indicates the L first vector(s).

In one sub-embodiment, the first bit block implicitly indicates the R second type parameter group(s).

In one sub-embodiment, the R is indicated by the R1.

In one sub-embodiment, the R is a rank.

In one sub-embodiment, the R is the layer number.

In one sub-embodiment, the L first vector(s) is(are) indicated by PMI.

In one sub-embodiment, the L first vector(s) is(are) indicated by PMI wideband information.

In one sub-embodiment, the L first vector(s) is(are) indicated by at least the former of $i_{1,1}$ and $i_{1,2}$. For the specific definition of $i_{1,1}$, refer to section 5.2.2.2.3 or section 5.2.2.2.4 in 3GPP TS38.214 (V15.1.0). For the specific definition of $i_{1,2}$, refer to section 5.2.2.2.3 in 3GPP TS38.214.

In one sub-embodiment, the L first vectors are orthogonal to each other.

In one sub-embodiment, the L first vector(s) is(are) L column(s) of a Fourier matrix of Q2 dimensions, the Q2 is the number of elements included in any one of the L first vector(s).

In one sub-embodiment, the R second type parameter group(s) is(are) indicated by PMI.

In one sub-embodiment, the R second type parameter group(s) is(are) indicated by PMI wideband information.

In one sub-embodiment, the first second type parameter group in the R second type parameter group(s) is determined by $i_{1,3,l}$ and $i_{1,4,l}$, and the "l" is a positive integer not greater than the R. For specific definitions of the $i_{1,3,l}$ and the $i_{1,4,l}$, refer to section 5.2.2.2.3 or section 5.2.2.2.4 of 3GPP TS 38.214 (V15.1.0).

In one sub-embodiment, the first L second type parameters in any one of the R second type parameter group(s) and the L first vector(s) are in one-to-one correspondence. The last L second type parameters in any one of the R second type parameter group(s) and the L first vector(s) are in one-to-one correspondence.

In one sub-embodiment, the R is a positive integer not greater than 6.

In one sub-embodiment, the R is a positive integer not greater than 8.

In one sub-embodiment, the P is equal to 2.

In one sub-embodiment, the P is greater than 2.

In one sub-embodiment, the R3 is equal to the R.

In one sub-embodiment, the R3 is smaller than the R.

In one sub-embodiment, when the number of element included in any of the R3 merge vector(s) is not greater than 4, the L is equal to 2.

In one sub-embodiment, when the number of element included in any of the R3 merge vector(s) is not greater than 4 and the R is not greater than 2, the L is equal to 2.

In one sub-embodiment, when $P_{CSI-RS}$ is not greater than 4, the L is equal to 2. The $P_{CSI-RS}$ is the number of CSI-RS (Channel State Information Reference Signals) ports. For the specific definition of the $P_{CSI-RS}$, refer to section 5.2.2.2.3 or section 5.2.2.2.4 in 3GPP TS38.214.

In one sub-embodiment, when $P_{CSI-RS}$ is not greater than 4 and the R is not greater than 2, the L is equal to 2; The $P_{CSI-RS}$ is the number of CSI-RS ports. For the specific definition of the $P_{CSI-RS}$, refer to section 5.2.2.2.3 or section 5.2.2.2.4 in 3GPP TS38.214.

In one sub-embodiment, the R3 merge vector(s) and the R3 second type parameter group(s) are in one-to-one correspondence.

Embodiment 2

Embodiment 2 illustrates a schematic diagram of a network architecture, as shown in the figure.

Figure 2:
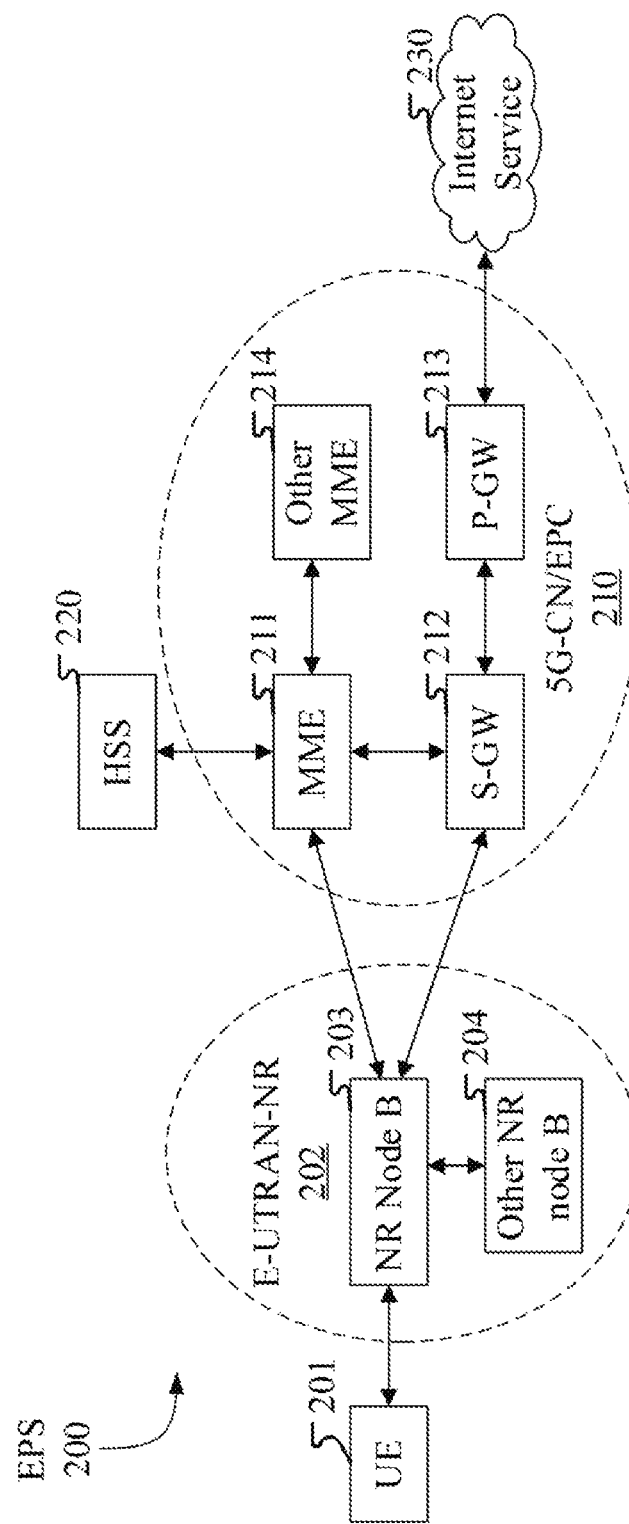
FIG. 2 is a schematic diagram of a network architecture according to one embodiment of the present disclosure.

FIG. 2 illustrates a network architecture 200 of LTE (Long-Term Evolution), LTE-A (Long-Term Evolution Advanced) and future 5G systems. The LTE network architecture 200 may be referred to as an EPS (Evolved Packet System) 200. The EPS 200 may include one or more UEs (User Equipment) 201, an E-UTRAN-NR (Evolved UMTS Terrestrial Radio Access Network—New Wireless) 202, a 5G-CN (5G-CoreNetwork, 5G core network)/EPC (Evolved Packet Core) 210, a HSS (Home Subscriber Server) 220 and Internet Service 230. Wherein the UMTS corresponds to the Universal Mobile Telecommunications System. The EPS 200 may be interconnected with other access networks, but for the sake of simplicity, these entities/interfaces are not shown. As shown in the FIG. 2, the EPS 200 provides packet switching services. Those skilled in the art would readily appreciate that the various concepts presented throughout this disclosure can be extended to networks or other cellular networks that provide circuit switching services. E-UTRAN-NR 202 comprises NR(New Radio) Node B(gNB) 203 and other gNB 204. The gNB 203 provides user and control plane protocol terminations for the UE 201. The gNB 203 can be connected to other gNBs 204 via an X2 interface (e.g., a backhaul). The gNB 203 may also be referred to as a base station, a base transceiver station, a radio base station, a radio transceiver, a transceiver function, a basic service set (BSS), an extended service set (ESS), a transmission and reception point (TRP), or some other suitable terminology. The gNB 203 provides the UE 201 with an access point to the 5G-CN/EPC 210. In the embodiments, the UE 201 comprises cellular telephones, smart phones, Session Initiation Protocol (SIP) phones, laptop computers, personal digital assistants (PDAs), satellite radios, global positioning systems, multimedia devices, video devices, digital audio player (e.g. MP3 players), cameras, game consoles, drones, aircrafts, narrowband physical network devices, machine type communication devices, land vehicles, cars, wearable devices, or any other similar to functional devices. A person skilled in the art may also refer to UE 201 as a mobile station, a subscriber station, a mobile unit, a subscriber unit, a radio unit, a remote unit, a mobile device, a radio device, a radio communication device, a remote device, a mobile subscriber station, an access terminal, a mobile terminal, a radio terminal, remote terminal, handset, user agent, mobile client, client or some other suitable term. The gNB 203 is connected to the 5G-CN/EPC 210 through an S1 interface. 5G-CN/EPC 210 comprises MME 211, other MME 214, S-GW (Service Gateway) 212 and P-GW (Packet Date Network Gateway) 213. MME 211 is a control node that handles a signaling between the UE 201 and 5G-CN/EPC 210. In general, the MME 211 provides bearer and connection management. All User IP (Internet Protocal) packets are transmitted through the S-GW 212, and the S-GW 212 itself is connected to the P-GW 213. P-GW 213 provides UE IP address allocation as well as other functions. The P-GW 213 is connected to the internet service 230. The internet service 230 includes an operator-compatible internet protocol service, and may specifically include the Internet, an intranet, an IP Multimedia Subsystem (IMS), and a PS streaming service (PSS).

In one sub-embodiment, the gNB 203 corresponds to the base station in the present disclosure.

In one sub-embodiment, the UE 201 corresponds to the user equipment in the present disclosure.

In one sub-embodiment, the UE 201 supports PMI feedback based on a Type II codebook.

In one sub-embodiment, the gNB 203 supports PMI feedback based on Type II codebook.

In one sub-embodiment, the UE 201 supports PMI feedback based on a Type II port selection codebook.

In one sub-embodiment, the gNB 203 supports PMI feedback based on the Type II port selection codebook.

Embodiment 3

Figure 3:
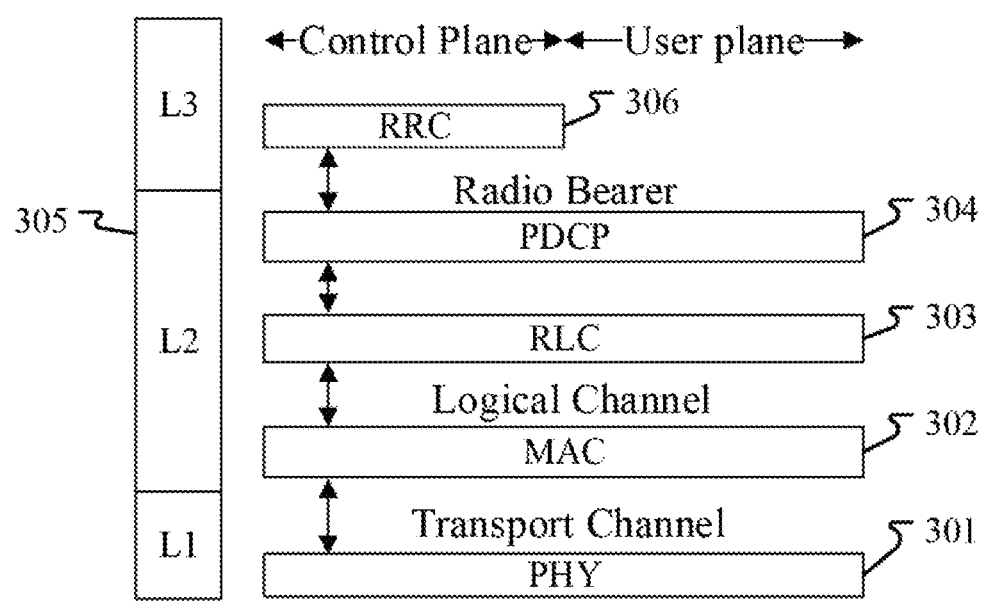
FIG. 3 is a schematic diagram of an embodiment of a radio protocol architecture of a user plane and a control plane in accordance with one embodiment of the present disclosure.

Embodiment 3 illustrates a schematic diagram of a radio protocol architecture of a user plane and a control plane according to an embodiment of the present disclosure, as shown in FIG. 3.

FIG. 3 is a schematic diagram illustrating an embodiment of a radio protocol architecture for a user plane and a control plane, and FIG. 3 illustrates a radio protocol architecture for the UE and gNB in three layers: layer 1, layer 2 and layer 3. Layer 1 (L1 layer) is the lowest layer and implements various PHY (physical layer) signal processing functions. The L1 layer will be referred to herein as PHY 301. Layer 2 (L2 layer) 305 is above PHY 301 and is responsible for the link between the UE and the gNB through PHY 301. In the user plane, L2 layer 305 comprises a MAC (Medium Access Control) sub-layer 302, RLC (Radio Link Control) sub-layer 303 and PDCP (Packet Data Convergence Protocol) sublayer 304, and these sub-layers terminate at the gNB on the network side. Although not illustrated, the UE may have several upper layers above the L2 layer 305, including a network layer (e.g. an IP layer) terminated at the P-GW 213 on the network side and an application layer (e.g. a remote UE, a server, etc.) terminated at the other side of the connection. The PDCP sub-layer 304 provides multiplexing between different radio bearers and logical channels. The PDCP sublayer 304 also provides header compression for upper layer packets to reduce radio transmission overhead, and provides security by encrypting packets, and provides support for UE handovers between gNBs. The RLC sublayer 303 provides segmentation and reassembly of upper layer packets, retransmission of lost packets and the reordering of packets to compensate for the disordered reception resulted from the HARQ (Hybrid Automatic Repeat request). The MAC provides multiplexing between the logical and transport channels. The MAC sublayer 302 is also responsible for allocating various radio resources (e.g. resource blocks) in one cell between UEs. The MAC sublayer 302 is also responsible for HARQ operations. In the control plane, the radio protocol architecture for the UE and gNB is substantially the same as the radio protocol architecture in the user plane for the physical layer 301 and the L2 layer 305, but there is no header compression function for the control plane. The control plane also comprises a RRC (Radio Resource Control) sublayer 306 on Layer 3 (L3 layer). The RRC sublayer 306 is responsible for obtaining radio resources (i.e. radio bearers) and configuring the lower layer using an RRC signaling between the gNB and the UE.

In one sub-embodiment, the radio protocol architecture of FIG. 3 is applicable to the user equipment of the present disclosure.

In one sub-embodiment, the radio protocol architecture of FIG. 3 is applicable to the base station of the present disclosure.

In one sub-embodiment, the first information of the present disclosure is generated on the MAC sublayer 302.

In one sub-embodiment, the first information of the present disclosure is generated on the RRC sublayer 306.

In one sub-embodiment, the first radio signal of the present disclosure is generated on the PHY 301.

In one sub-embodiment, the first bit block of the present disclosure is formed on the PHY 301.

In one sub-embodiment, the first signaling of the present disclosure is generated on the PHY 301.

In one sub-embodiment, the first signaling of the present disclosure is generated on the MAC sublayer 302.

In one sub-embodiment, the first reference signal of the present disclosure is generated on the PHY 301.

In one sub-embodiment, the second radio signal of the present disclosure is generated on the PHY 301.

Embodiment 4

Figure 4:
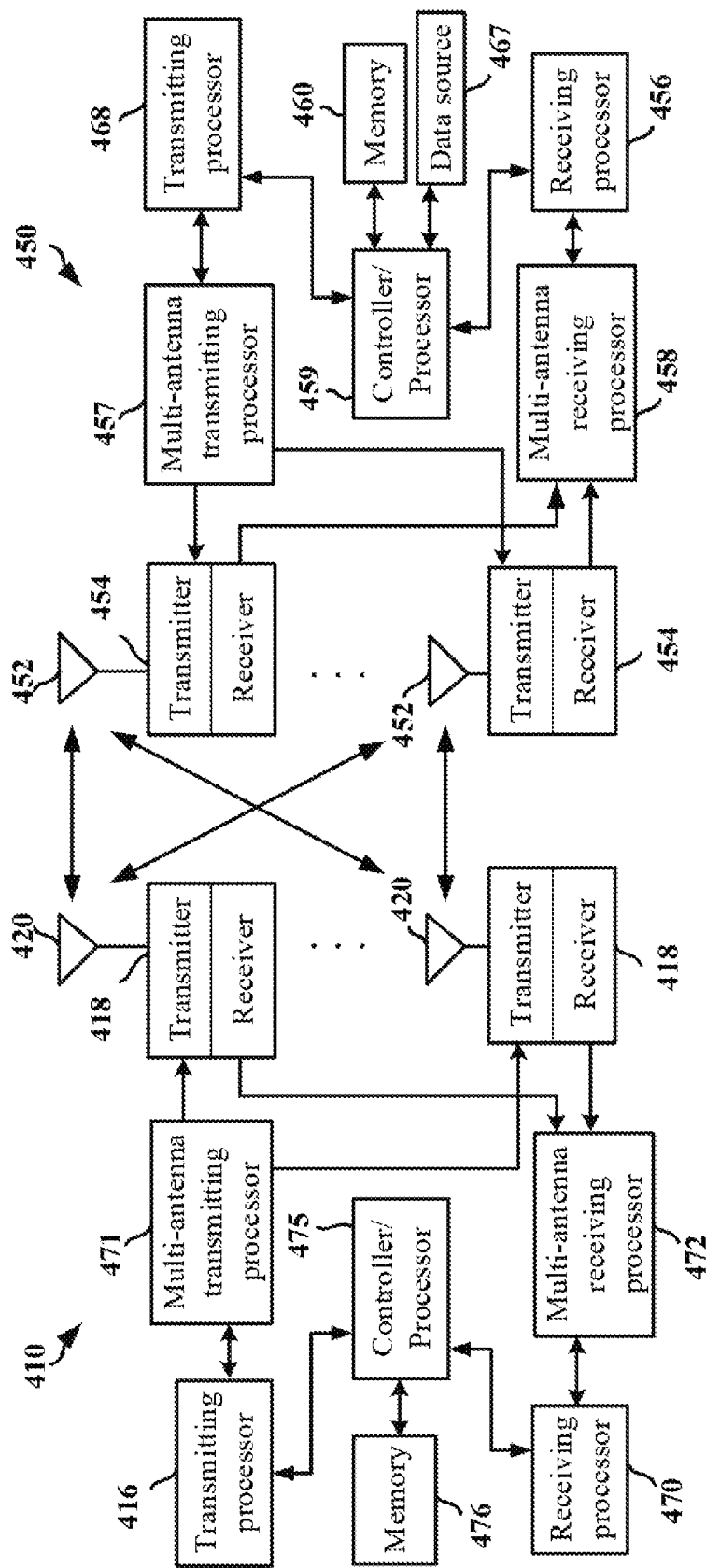
FIG. 4 is a schematic diagram of an NR (New Radio) node and a UE (User Equipment) according to one embodiment of the present disclosure.

Embodiment 4 shows a schematic diagram of an NR node and a UE. As shown in FIG. 4, FIG. 4 is a block diagram of a UE 450 in communication with a gNB 410 in an access network.

The gNB 410 may include a controller/processor 475, memory 476, a receiving processor 470, transmitting processor 416, multi-antenna receiving processor 472, multi-antenna transmitting processor 471, a transmitter/receiver 418 and an antenna 420.

UE 450 comprises a controller/processor 459, a memory 460, a data source 467, a transmitting processor 468, a receiving processor 456, multi-antenna transmitting processor 457, multi-antenna receiving processor 458, a transmitter/receiver 454 and an antenna 452.

In DL (Downlink), upper layer packets from the core network are provided to the controller/processor 475 at gNB 410. The controller/processor 475 implements the functionality of the L2 layer. In DL, the controller/processor 475 provides header compression, encryption, packet segmentation and reordering, and multiplexing between logical and transport channels, and radio resource allocation to UE 450 based on various priorities. The controller/processor 475 is also responsible for HARQ operations, retransmission of lost packets, and a signaling to the UE 450. The transmitting processor 416 and multi-antenna transmitting processor 471 implement various signal transmission processing functions for the L1 layer (i.e., the physical layer). The transmitting processor 416 implements the encoding and interleaving to facilitate forward error correction (FEC) at the UE 450 and signal cluster mapping based on various modulation schemes (eg, binary phase shift keying (BPSK), quadrature phase shift keying (QPSK), M phase shift keying (M-PSK), M quadrature amplitude modulation (M-QAM)). The multi-antenna transmitting processor 471 performs digital spatial precoding on the encoded and modulated symbols, including codebook based precoding and non-codebook based precoding and beamforming processing to generate one or more spatial streams. The transmitting processor 416 then maps each spatial stream to subcarriers, multiplexed with reference signals (e.g., pilots) in the time and/or frequency domain, and then uses inverse fast Fourier transform (IFFT) to generate physical channel carrying a time domain multi-carrier symbol stream. The multi-antenna transmitting processor 471 then transmits an analog precoding/beamforming operation to the time domain multi-carrier symbol stream. Each transmitter 418 converts the baseband multi-carrier symbol stream provided by the multi-antenna transmitting processor 471 into a radio frequency stream, which is then provided to a different antenna 420.

In DL (Downlink), each receiver 454 receives signals through corresponding antenna 452 at UE 450. Each receiver 454 recovers the information modulated onto the radio frequency carrier wave and converts the radio frequency stream into a baseband multi-carrier symbol stream provided to the receive processor 456. The receiving processor 456 and the multi-antenna receiving processor 458 implement various signal processing functions of the L1 layer. Multi-antenna receiving processor 458 preforms the operation of receiving analog precoding/beamforming to baseband multicarrier symbol streams from receiver 454. The receiving processor 456 converts the baseband multi-carrier symbol stream after receiving the analog precoding/beamforming operation from the time domain to the frequency domain using a Fast Fourier Transform (FFT). In the frequency domain, the physical layer data signal and the reference signal are demultiplexed by the receiving processor 456, wherein the reference signal will be used for channel estimation, and the data signal is recovered by the multi-antenna detection in the multi-antenna receiving processor 458 to be any spatial stream targeting the UE 450. The symbols on each spatial stream are demodulated and recovered in receiving processor 456 and generate soft decisions. The receiving processor 456 then decodes and deinterleaves the soft decision to recover the upper layer data and control signals transmitted by the gNB 410 in the physical channel. The upper layer data and control signals are then provided to the controller/processor 459. The controller/processor 459 implements the function of the L2 layer. The controller/processor 459 can be associated with memory 460 that stores program code and data. The memory 460 can be referred to as a computer readable medium. In DL, the controller/processor 459 provides demultiplexing, packet reassembly, decryption, header decompression, and control signal processing between the transmitting and logical channels to recover upper layer packets from the core network. The upper layer packet is then provided to all protocol layers above the L2 layer. Various control signals can also be supplied to L3 for L3 processing. The controller/processor 459 is also responsible for error detection using an acknowledgement (ACK) and/or negative acknowledgement (NACK) protocol to support HARQ operations.

In UL (Uplink), data source 467 is used to provide upper layer packets to controller/processor 459 at UE 450. The data source 467 represents all protocol layers above the L2 layer. Similar to the transmitting function at gNB 410 described in DL, the controller/processor 459 provides header compression, encryption, packet segmentation and reordering, and multiplexing between logical and transport channels based on wireless resource allocation of gNB 410 to implement L2 layer protocols for the user plane and the control plane. The controller/processor 459 is also responsible for HARQ operations, retransmission of lost packets, and a signaling to the gNB 410. Transmitting processor 468 performs modulation mapping and channel coding processing. The multi-antenna transmitting processor 457 performs digital multi-antenna spatial precoding, including codebook based precoding and non-codebook based precoding, and beamforming processing. The transmitting processor 468 then modulates the generated spatial stream into a multi-carrier/single-carrier symbol stream, which is provided to the different antennas 452 via the transmitter 454 after the analog pre-coding/beamforming operation in the multi-antenna transmitting processor 457. Each transmitter 454 first converts the baseband symbol stream provided by the multi-antenna transmit processor 457 into a radio frequency symbol stream and provides it to the antenna 452.

In UL (Uplink), the function at gNB 410 is similar to the receiving function at UE 450 described in the DL. Each receiver 418 receives a radio frequency signal through corresponding antenna 420, then converts the received radio frequency signal into a baseband signal, and provides the baseband signal to a multi-antenna receiving processor 472 and receiving processor 470. The receiving processor 470 and the multi-antenna receiving processor 472 implement the functions of the L1 layer together. The controller/processor 475 implements the function of L2 layer. The controller/processor 475 can be associated with the memory 476 that stores program code and data. The memory 476 can be referred to as a computer readable medium. In UL, the controller/processor 475 provides demultiplexing, packet reassembly, decryption, header decompression, and control signal processing between the transport and logical channels to recover upper layer packets from the UE 450. Upper layer packets from the controller/processor 475 can be provided to the core network. The controller/processor 475 is also responsible for error detection using ACK and/or NACK protocols to support HARQ operations.

In one sub-embodiment, the UE 450 includes: at least one processor and at least one memory. The at least one memory includes computer program code. The at least one memory and the computer program code are configured to be used together with the at least one processor. The UE 450 at least: receives the first information of the present disclosure; transmit the first radio signal of the present disclosure. Wherein the first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

In one sub-embodiment, the UE 450 includes a memory storing a computer readable instruction program that, when executed by at least one processor, performs operations. The operations include: receiving the first information of the present disclosure; transmitting the first radio signal of the present disclosure. Wherein the first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

In one sub-embodiment, the gNB 410 includes: at least one processor and at least one memory. The at least one memory includes computer program code. The at least one memory and the computer program code are configured to use with the at least one processor together. The UE 450 at least: transmit the first information of the present disclosure; receive the first radio signal of the present disclosure. Wherein the first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

In one sub-embodiment, the gNB 410 includes: a memory storing a computer readable instruction program that, when executed by at least one processor, performs operations. The operations include: transmitting the first information of the present disclosure; receiving the first radio signal of the present disclosure. Wherein the first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

In one sub-embodiment, the gNB 410 corresponds to the base station of the present disclosure.

In one sub-embodiment, the UE 450 corresponds to the user equipment of the present disclosure.

In one sub-embodiment, at least one of {the antenna 452, the receiver 454, the receiving processor 456, the multi-antenna receiving processor 458, the controller/processor 459, the memory 460, the data source 467} is used to receive the first information of the disclosure; at least one of {the antenna 420, the transmitter 418, the transmitting processor 416, the multi-antenna transmitting processor 471, the controller/processor 475, the memory 476} is used to transmit the first information of the disclosure.

In one sub-embodiment, at least one of {the antenna 420, the receiver 418, the receiving processor 470, the multi-antenna receiving processor 472, the controller/processor 475, the memory 476} is used to receive the first radio signal in the present disclosure; at least one of {the antenna 452, the transmitter 454, the transmit processor 468, the multi-antenna transmitting processor 457, the controller/processor 459, the memory 460, the data source 467} is used to transmit the first radio signal in the present disclosure.

In one sub-embodiment, at least one of {the antenna 452, the receiver 454, the receiving processor 456, the multi-antenna receiving processor 458, the controller/processor 459, the memory 460, the data source 467} is used to receive the first signaling in the present disclosure; at least one of {the antenna 420, the transmitter 418, the transmitting processor 416, the multi-antenna transmitting processor 471, the controller/processor 475, the memory 476} is used to transmit the first signaling in the present disclosure.

In one sub-embodiment, at least one of {the antenna 452, the receiver 454, the receiving processor 456, the multi-antenna receiving processor 458, the controller/processor 459} is used to receive the first reference signal in the present disclosure; at least one of {the antenna 420, the transmitter 418, the transmitting processor 416, the multi-antenna transmitting processor 471, the controller/processor 475} is used to transmit the first reference signal in the present disclosure.

In one sub-embodiment, at least one of {the antenna 452, the receiver 454, the receiving processor 456, the multi-antenna receiving processor 458, the controller/processor 459, the memory 460, the data source 467} is used to receive the second radio signal in the present disclosure; at least one of {the antenna 420, the transmitter 418, the transmitting processor 416, the multi-antenna transmitting processor 471, the controller/processor 475, the memory 476} is used to transmit the second radio signal in the present disclosure.

Embodiment 5

Figure 5:
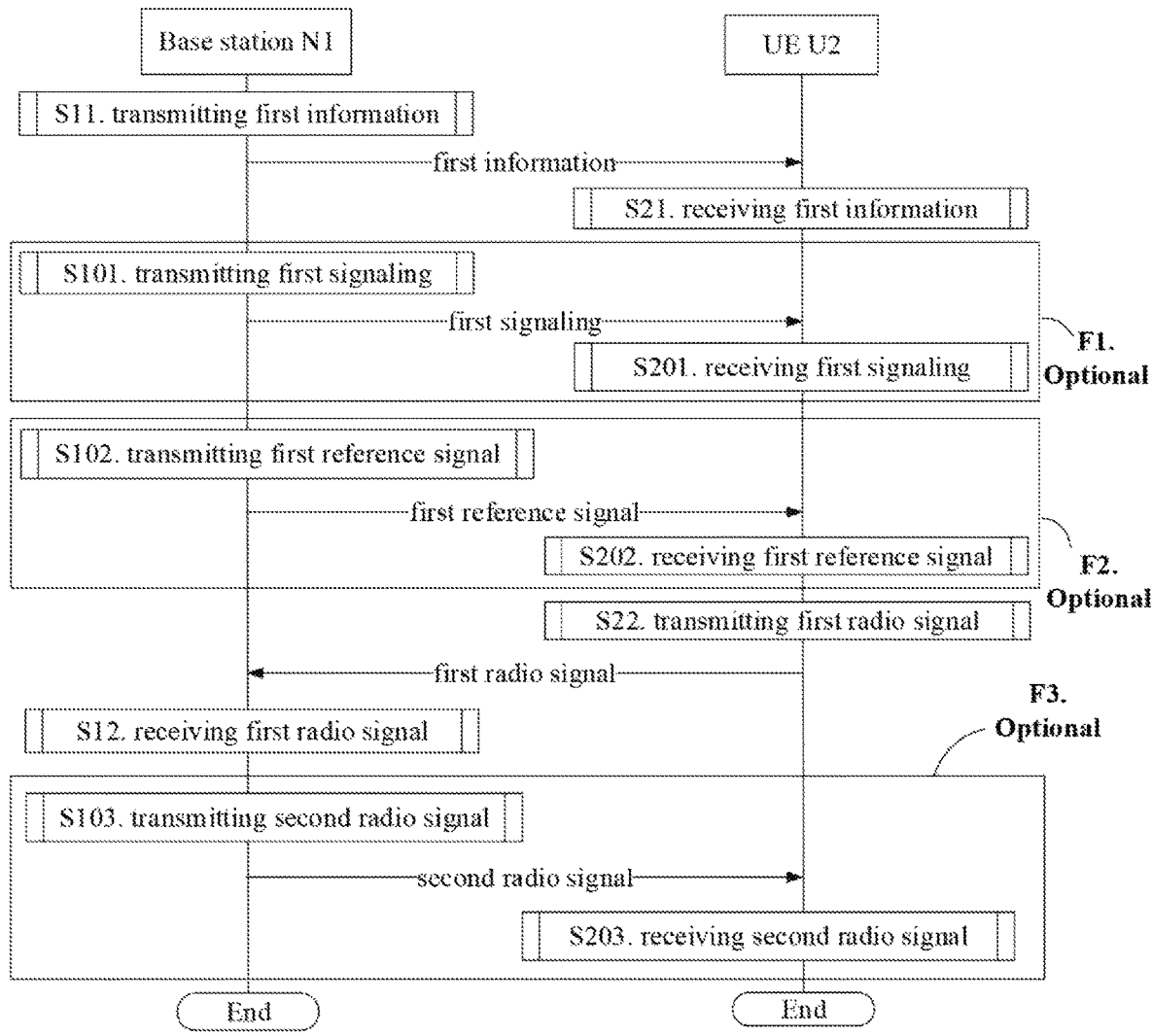
FIG. 5 is a flow chart of wireless transmitting according to one embodiment of the present disclosure.

Embodiment 5 illustrates the flowchart of wireless transmitting, as shown in FIG. 5. In FIG. 5, the base station N1 is a serving cell maintenance base station of the user equipment U2. In FIG. 5, the steps in block F1, block F2 and block F3 are optional.

For N1, it transmits the first information in step S11; it transmits the first signaling in step S101; it transmits the first reference signal in step S102; it receives the first radio signal in step S12; it transmits in step S103 second radio signal.

For U2, it receives the first information in step S21; it receives the first signaling in step S201; it receives the first reference signal in step S202; it transmits the first radio signal in step S22; it receives the second radio signal in step S203.

In embodiment 5, wherein the first radio signal carries a first bit block, the first bit block being used to determine R, L first vectors and R second type parameter group(s) by the N1; the R is used to determine the L from P candidate integers by the N1 and the U2, respectively; the first information is used to determine the P candidate integers by the U2; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s) by the N1; the P is a positive integer greater than 1; the R is a positive integer; the R3 is a positive integer not greater than the R; the P candidate integers are positive integers greater than 1. Wherein the first signaling indicates scheduling information of the first radio signal. The measurement for the first reference signal is used to determine the first bit block by the U2. The R3 merge vector is used to generate the second radio signal with the R3 being 1 by the N1, or some or all of the R3 merge vectors are used to generate the second radio signal with the R3 being larger than 1 by the N1.

In one sub-embodiment, the first bit block is used to determine R1 third type parameter subgroup(s) by the N1; the R1 third type parameter subgroup(s) is(are) respectively a subset(subsets) of R1 third type parameter group(s) in R third type parameter group(s); the R1 is a positive integer not greater than the R; each of the R third type parameter group(s) comprises a positive integer number of third type parameters; each third type parameter of the R third type parameter group(s) corresponds to one second type parameter of the R second type parameter group(s); whether a reference third type parameter belongs to the R1 third type parameter subgroup(s) is associated with at least one of an index of a reference third type parameter group in the R third type parameter group(s) and a magnitude of a second type parameter corresponding to the reference third type parameter; the reference third type parameter is any third type parameter of the R third type parameter group(s); the reference third type parameter group is a third type parameter group comprising the reference third type parameter in the R third type parameter group(s).

In one sub-embodiment, the R third type parameter group(s) and the R second type parameter group(s) are in one-to-one correspondence; a number of third type parameters included in any one of the R third type parameter group(s) is equal to a number of non-zero second type parameters in a corresponding second type parameter group; all the third type parameters in any one of the R third type parameter group(s) and all the non-zero second type parameters in the corresponding second type parameter group are in one-to-one correspondence.

In one sub-embodiment, the first bit block indicates the R1 third type parameter subgroup(s).

In one sub-embodiment, the first bit block explicitly indicates the R1 third type parameter subgroup(s).

In one sub-embodiment, the first bit block implicitly indicates the R1 third type parameter subgroup(s).

In one sub-embodiment, the R1 third type parameter subgroup(s) is(are) used to generate the R3 merge vector or some or all of the merge vectors of the R3 merge vectors.

In one sub-embodiment, the R1 is greater than the R3.

In one sub-embodiment, the R1 is equal to the R3.

In one sub-embodiment, the R1 is smaller than the R3.

In one sub-embodiment, the first bit block is irrelevant to any third type parameter which does not belong to the R1 third type parameter subgroup(s) of R third type parameter group(s).

In one sub-embodiment, the first radio signal is irrelevant to any third parameter that does not belong to the R1 third type parameter subgroup(s) of the R third type parameter group(s).

In one sub-embodiment, the R1 is greater than the R3, and only R3 third type parameter subgroup(s) of the R1 third type parameter subgroup(s) is(are) used to generate the R3 merge vector(s).

In one sub-embodiment of the foregoing embodiment, the R3 third type parameter subgroup(s) and the R3 second type parameter group(s) are in one-to-one correspondence.

In one sub-embodiment of the foregoing embodiment, the R3 third type parameter subgroup(s) is(are) used to generate the R3 merge vector(s).

In one sub-embodiment, the R1 is less than or equal to the R3, and the R1 third type parameter subgroup(s) is(are) used to generate the R1 merge vector(s) in the R3 merge vectors.

In one sub-embodiment of the foregoing embodiment, all the merge vectors except the R1 merge vector(s) in the R3 merge vectors are irrelevant to the R1 third type parameter subgroup(s).

In one sub-embodiment, each third type parameter of the R third type parameter group(s) only corresponds to one second type parameter of the R second type parameter group(s).

In one sub-embodiment, the R1 is smaller than the R, whether the reference third type parameter belongs to the R1 third type parameter subgroup(s) is only associated with the former of an index of a reference third type parameter group in the R third type parameter group(s) and a magnitude of a second type parameter corresponding to the reference third type parameter.

In one sub-embodiment, the R1 is equal to the R, whether the reference third type parameter belongs to the R1 third type parameter subgroup(s) is only associated with the latter of an index of a reference third type parameter group in the R third type parameter group(s) and a magnitude of a second type parameter corresponding to the reference third type parameter.

In one sub-embodiment, the R1 is smaller than the R, whether the reference third type parameter belongs to the R1 third type parameter subgroup(s) is associated with both the former and the latter of an index of a reference third type parameter group in the R third type parameter group(s) and a magnitude of a second type parameter corresponding to the reference third type parameter.

In one sub-embodiment, the R1 third type parameter subgroup(s) and the R1 second type parameter group(s) in the R second type parameter group(s) are in one-to-one correspondence; the R1 second type parameter group(s) and the R1 third type parameter group(s) are in one-to-one correspondence.

In one sub-embodiment, the first bit block is used to determine R2 fourth type parameter subgroup(s) by the N1, the R2 fourth type parameter subgroup(s) is(are) respectively a subset(subsets) of R2 fourth type parameter group(s) in R fourth type parameter group(s), the R2 is a positive integer not greater than the R, each of the R fourth type parameter group(s) comprises a positive integer number of fourth type parameters, each fourth type parameter of the R fourth type parameter group(s) corresponds to one second type parameter of the R second type parameter group(s), whether a reference fourth type parameter belongs to the R2 fourth type parameter subgroup(s) is associated with at least one of an index of a reference fourth type parameter group in the R fourth type parameter group(s) and a magnitude of a second type parameter corresponding to the reference fourth type parameter, the reference fourth type parameter is any fourth type parameter of the R fourth type parameter group(s), the reference fourth type parameter group is a fourth type parameter group comprising the reference fourth type parameter in the R fourth type parameter group(s).

In one sub-embodiment, the R fourth type parameter group(s) and the R second type parameter group(s) are in one-to-one correspondence; the number of the fourth type parameters included in any one of the R fourth type parameter group(s) is equal to the number of non-zero second type parameters in the corresponding second type parameter group; all the fourth type parameters in any one of the R fourth type parameter group(s) and all the non-zero second type parameters in the corresponding second type parameter group are in one-to-one correspondence.

In one sub-embodiment, the R2 fourth type parameter subgroup(s) is(are) used to generate the R3 merge vector or some or all of the merge vectors of the R3 merge vectors.

In one sub-embodiment, each fourth type parameter of the R fourth type parameter group(s) only correspond to one second type parameter of the R second type parameter group(s).

In one sub-embodiment, the first bit block is irrelevant to any fourth type parameter which does not belong to the R2 fourth type parameter subgroup(s) of R fourth type parameter group(s).

In one sub-embodiment, the first radio signal is irrelevant to any fourth type parameter which does not belong to the R2 fourth type parameter subgroup(s) of R fourth type parameter group(s).

In one sub-embodiment, the first bit block indicates the R2 fourth type parameter subgroup(s).

In one sub-embodiment, the first bit block explicitly indicates the R2 fourth type parameter subgroup(s).

In one sub-embodiment, the first bit block implicitly indicates the R2 fourth type parameter subgroup(s).

In one sub-embodiment, the R2 is smaller than the R1.

In one sub-embodiment, the R2 is equal to the R1.

In one sub-embodiment, the R2 is smaller than the R; whether the reference fourth type parameter belongs to the R2 fourth type parameter subgroup(s) is only associated with the former of an index of a reference fourth type parameter group in the R fourth type parameter group(s) and a magnitude of a second type parameter corresponding to the reference fourth type parameter.

In one sub-embodiment, the R2 is equal to the R; whether the reference fourth type parameter belongs to the R2 fourth type parameter subgroup(s) is only associated with the latter of an index of a reference fourth type parameter group in the R fourth type parameter group(s) and a magnitude of a second type parameter corresponding to the reference fourth type parameter.

In one sub-embodiment, the R2 is smaller than the R; whether the reference fourth type parameter belongs to the R2 fourth type parameter subgroup(s) is associated with the former and the latter of an index of a reference fourth type parameter group in the R fourth type parameter group(s) and a magnitude of a second type parameter corresponding to the reference fourth type parameter.

In one sub-embodiment, the R2 fourth type parameter subgroup(s) and the R2 second type parameter group(s) in the R second type parameter group(s) are in one-to-one correspondence; the R2 second type parameter group(s) and the R2 fourth type parameter group(s) are in one-to-one correspondence.

In one sub-embodiment, the scheduling information of the first radio signal includes at least one of {time domain resources occupied, frequency domain resources occupied, MCS (Modulation and Coding Scheme), configuration information of DMRS (DeModulation Reference Signals), HARQ (Hybrid Automatic Repeat reQuest) process number, RV (Redundancy Version), NDI (New Data Indicator), corresponding spatial transmission parameters (Spatial Tx parameters), corresponding spatial reception parameters (Spatial Rx parameters)}.

In one sub-embodiment, the first signaling is a physical layer signaling.

In one sub-embodiment, the first signaling is a dynamic signaling.

In one sub-embodiment, the first signaling is dynamic signaling for UpLink Grant.

In one sub-embodiment, the first signaling comprises DCI (Downlink Control Information).

In one sub-embodiment, the first signaling comprises UpLink Grant DCI.

In one sub-embodiment, the first signaling is UE specific.

In one sub-embodiment, the first reference signal comprises CSI-RS.

In one sub-embodiment, the R3 combining vector(s) is(are) used to determine a precoding matrix corresponding to the second radio signal.

In one sub-embodiment, a column vector in the precoding matrix corresponding to the second radio signal includes the R3 merge vector or some or all of the R3 merge vectors.

In one sub-embodiment, the R3 merge vector(s) is(are) used to determine a transmitting antenna port corresponding to the second radio signal.

In one sub-embodiment, the R3 combining vector(s) is(are) used to determine a spatial domain transmission filter corresponding to the second radio signal.

In one sub-embodiment, the first information is transmitted on a downlink physical layer data channel (ie, a downlink channel that can be used to carry physical layer data).

In one sub-embodiment of the foregoing embodiment, the downlink physical layer data channel is a PDSCH (Physical Downlink Shared CHannel)

In one sub-embodiment of the foregoing embodiment, the downlink physical layer data channel is a sPDSCH (short PDSCH).

In one sub-embodiment of the foregoing embodiment, the downlink physical layer data channel is a NR-PDSCH (New Radio PDSCH).

In one sub-embodiment of the foregoing embodiment, the downlink physical layer data channel is a NB-PDSCH (Narrow Band PDSCH).

In one sub-embodiment, the first radio signal is transmitted on an uplink physical layer data channel (ie, an uplink channel that can be used to carry physical layer data).

In one sub-embodiment of the foregoing embodiment, the uplink physical layer data channel is a PUSCH (Physical Uplink Shared CHannel).

In one sub-embodiment of the foregoing embodiment, the uplink physical layer data channel is a sPUSCH (short PUSCH).

In one sub-embodiment of the foregoing embodiment, the uplink physical layer data channel is a NR-PUSCH (New Radio PUSCH).

In one sub-embodiment of the foregoing embodiment, the uplink physical layer data channel is a NB-PUSCH (Narrow Band PUSCH).

In one sub-embodiment, the transmission channel corresponding to the first radio signal is a UL-SCH (Uplink Shared Channel).

In one sub-embodiment, the first signaling is transmitted on a downlink physical layer control channel (ie, a downlink channel that can only be used to carry physical layer signaling).

In one sub-embodiment of the foregoing embodiment, the downlink physical layer control channel is a PDCCH (Physical Downlink Control CHannel).

In one sub-embodiment of the foregoing embodiment, the downlink physical layer control channel is an EPDCCH (Enhanced PDCCH).

In one sub-embodiment of the foregoing embodiment, the downlink physical layer control channel is a sPDCCH (short PDCCH).

In one sub-embodiment of the foregoing embodiment, the downlink physical layer control channel is a NR-PDCCH (New Radio PDCCH).

In one sub-embodiment of the foregoing embodiment, the downlink physical layer control channel is a NB-PDCCH (Narrow Band PDCCH).

In one sub-embodiment, the second radio signal is transmitted on a downlink physical layer data channel (ie, a downlink channel that can be used to carry physical layer data).

In one sub-embodiment of the foregoing embodiment, the downlink physical layer data channel is a PDSCH.

In one sub-embodiment of the foregoing embodiment, the downlink physical layer data channel is a sPDSCH.

In one sub-embodiment of the foregoing embodiment, the downlink physical layer data channel is a NR-PDSCH.

In one sub-embodiment of the foregoing embodiment, the downlink physical layer data channel is a NB-PDSCH.

Embodiment 6

Embodiment 6 illustrates a schematic diagram in which R is used to determine L from P candidate integers as shown in FIG. 6.

In Embodiment 6, the P is equal to 2. The P candidate integers comprise a first candidate integer and a second candidate integer. The second candidate integer is a positive integer greater than the first candidate integer. If the R is not greater than the first rank threshold, the L is equal to the first candidate integer. If the R is greater than the first rank threshold, the L is equal to the second candidate integer. The first rank threshold is a positive integer.

In one sub-embodiment, the first candidate integer belongs to $\{2, 3, 4\}$.

In one sub-embodiment, the second candidate integer is greater than 4.

In one sub-embodiment, the second candidate integer is equal to 6.

In one sub-embodiment, the first rank threshold is configured by higher layer signaling.

In one sub-embodiment, the first rank threshold is small and common.

In one sub-embodiment, the first rank threshold is default (no configuration required).

In one sub-embodiment, the first rank threshold is fixed.

In one sub-embodiment, the first rank threshold is equal to 4.

In one sub-embodiment, the user equipment in the present disclosure determines the L from the P candidate integers according to the R.

In one sub-embodiment, the base station in the present disclosure determines the L from the P candidate integers according to the R.

Embodiment 7

Figure 7:
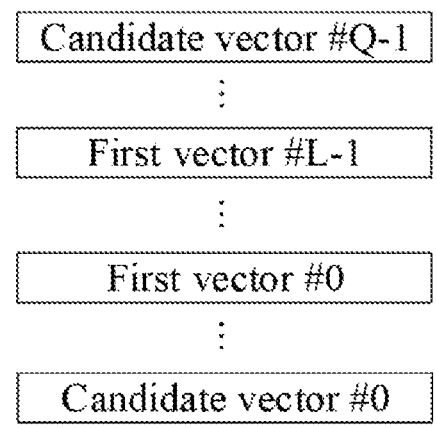
FIG. 7 is a schematic diagram of L first vector(s) in accordance with one embodiment of the present disclosure.

Embodiment 7 illustrates a schematic diagram of L first vectors, as shown in FIG. 7.

In Embodiment 7, the L first vectors are subsets of Q candidate vectors. The first bit block in the disclosure indicates the L first vectors from the Q candidate vectors, wherein the Q is a positive integer greater than the L. In FIG. 7, the indexes of the L first vectors are #$\{0, \ldots, L-1\}$, respectively. The indexes of the Q candidate vectors are #$\{0, \ldots, Q-1\}$, respectively.

In one sub-embodiment, the Q candidate vectors are configured by higher layer signaling.

In one sub-embodiment, the Q candidate vectors are fixed.

In one sub-embodiment, the Q candidate vectors are default.

In one sub-embodiment, for any given $P_{CSI-RS}$, the Q candidate vectors are fixed. The $P_{CSI-RS}$ is the number of CSI-RS ports. For the specific definition of the $P_{CSI-RS}$, refer to section 5.2.2.2.3 or section 5.2.2.2.4 in 3GPP TS38.214.

In one sub-embodiment, any one of the Q candidate vectors comprises a positive integer number of elements. Any two candidate vectors of the Q candidate vectors comprise equal numbers of elements.

In one sub-embodiment, the Q candidate vectors have the same numbers of dimension.

In one sub-embodiment, any one of the Q candidate vectors comprises an even number of elements.

In one sub-embodiment, the Q candidate vectors are divided into Q1 candidate vector groups. Any one of the Q1 candidate vector groups comprises Q2 candidate vectors. The product of Q1 and Q2 is equal to the Q. Q2 candidate vectors in any one of the Q1 candidate vector groups are mutually orthogonal. Candidate vectors belonging to different candidate vector groups in the Q1 candidate vector groups are non-orthogonal. The L first vectors belong to one candidate vector group of the Q1 candidate vector groups.

In one sub-embodiment of the foregoing embodiment, the first bit block indicates a first candidate vector group in the Q1 candidate vector group, and indicates the L first vectors in the first candidate vector group. The first candidate vector group is a candidate vector group comprising the L first vectors in the Q1 candidate vector groups.

In one sub-embodiment of the foregoing embodiment, all candidate vectors in any one of the Q1 candidate vector groups constitute a Fourier matrix.

In one sub-embodiment of the foregoing embodiment, all candidate vectors in any one of the Q1 candidate vector groups are composed of all columns of a Fourier matrix in Q2 dimension.

Embodiment 8

Embodiment 8 illustrates a schematic diagram of R second type parameter group(s), as shown in FIG. 8.

In Embodiment 8, each of the R second type parameter group(s) includes L2 second type parameters. The L2 is equal to the L multiplied by 2 in the present r. There is one and only one second type parameter which is constantly "1" in any second type parameter group of the R second type parameter groups. In FIG. 8, the indexes of the L2 second type parameters in the second type parameter group #i in the R second type parameter groups are #{(i,0), . . . , (i,L2−1)}, wherein the "i" is any non-negative integer less than the R.

In one sub-embodiment, any second type parameter of the R second type parameter group(s) is a non-negative real number not greater than one.

In one sub-embodiment, there is one and only one second type parameter which is constantly "1" in any second type parameter group of the R second type parameter groups.

In one sub-embodiment, the first bit block in the present disclosure is used to determine the position of the second type parameter, which is constantly "1", in each second parameter group of the R second type parameter groups.

In one sub-embodiment, any second type parameter of the R second type parameter group(s) belongs to $\{0, 1/\sqrt{64}, 1/\sqrt{32}, 1/\sqrt{16}, 1/\sqrt{8}, 1/\sqrt{4}, 1/\sqrt{2}, 1/\}$.

Embodiment 9

Figure 9:
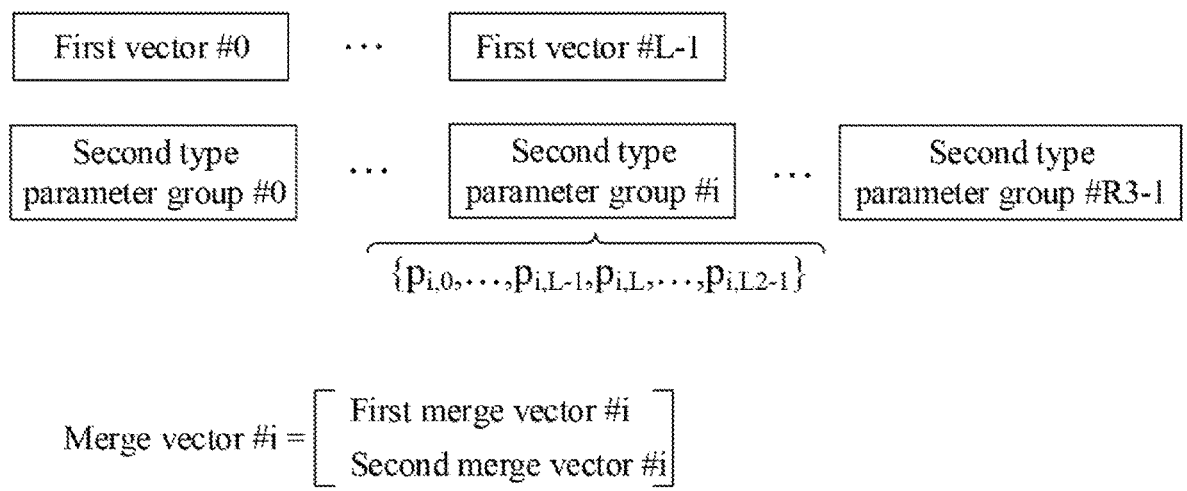
FIG. 9 is a schematic diagram of R3 second type parameter group(s) and L first vector(s) used to respectively generate R3 merge vector(s), according to one embodiment of the present disclosure.

Embodiment 9 illustrates a schematic diagram of R3 second type parameter group(s) and L first vectors that are used to generate R3 merge vectors. As shown in FIG. 9, the indexes of the L first vectors are respectively #{0, . . . , L−1}. The indexes of the R3 second type parameter group(s) and the R3 merge vectors are respectively #{0, . . . , R3−1}. The second type parameter group and the merge vector having identical index correspond to each other. Each second type parameter group of the R3 second type parameter groups comprises L2 second type parameters.

In Embodiment 9, the merge vector #i is concatenated by a first merge vector #i and a second merge vector #i, the "i" is a non-negative integer smaller than the R3. The first merge vector #i is generated by adding the weighting of the L first vectors by the first L second type parameters in the second type parameter group #i to the L first vectors. The second merge vector #i is generated by adding the weighting of the L first vectors by the last L second type parameters in the second type parameter group #i to the L first vectors. The L2−1 second type parameters in the second type parameter group #i are {pi,0, . . . , pi,L−1,pi,L, . . . , pi,L2−1}.

In one sub-embodiment, the R3 merge vector(s) and the R3 second type parameter group(s) is(are) in one-to-one correspondence.

In one sub-embodiment, the third type parameter group corresponding to the merge vector #i in the R third type parameter group(s) in the present disclosure is not a third type parameter group in the R1 third type parameter group(s) in the present disclosure.

In one sub-embodiment, the fourth type parameter group corresponding to the merge vector #i in the R fourth type parameter group(s) in the present disclosure is not a fourth type parameter group in the R2 fourth type parameter group(s) in the present disclosure.

In one sub-embodiment, the R3 second type parameter group(s) is(are) the most front R3 second type parameter group(s) in the R second type parameter group(s) in the present disclosure.

In one sub-embodiment, the R3 second type parameter group(s) is(are) the R3 second type parameter group(s) having the smallest index in the R second type parameter group(s) in the present disclosure.

In one sub-embodiment, the indexes of the R3 second type parameter group(s) in the R second type parameter group(s) are 0 to the R3−1, respectively.

In one sub-embodiment, any merge vector of the R3 merge vectors comprises a positive integer number of elements. Any two merge vectors of the R3 merge vectors comprise the same number of elements.

In one sub-embodiment, the R3 merge vectors have the same dimension.

In one sub-embodiment, the number of elements included in any of the R3 merge vectors is even.

In one sub-embodiment, the first half of the merge vector #i constitutes the first merge vector #i. The second half of the merge vector #i constitutes the second merge vector #i.

Embodiment 10

Figure 10:
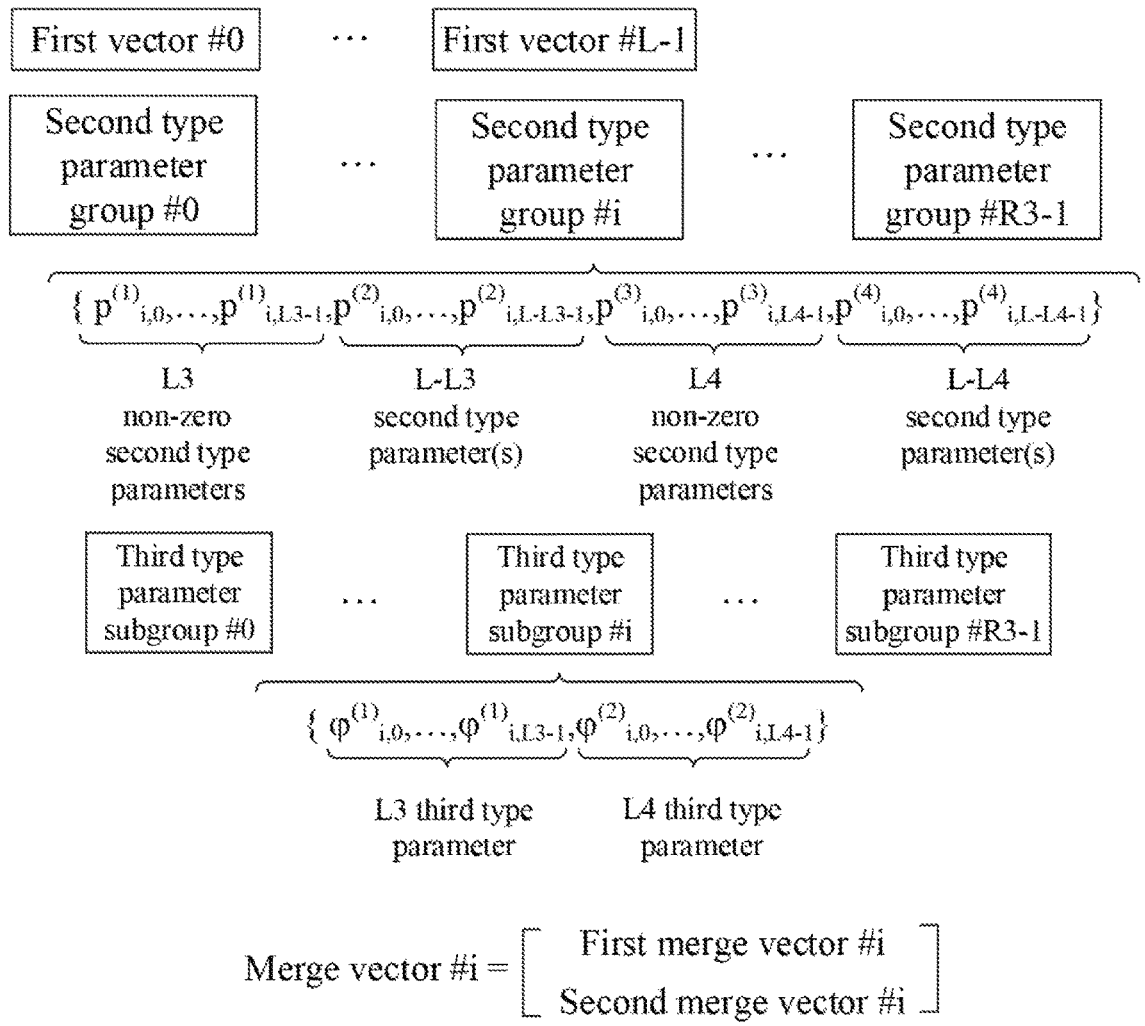
FIG. 10 is a schematic diagram of R3 second type parameter group(s), L first vector(s) and R1 third type parameter subgroup(s) that are used to generate R3 merge vector(s), according to one embodiment of the present disclosure.

Embodiment 10 illustrates a schematic diagram of R3 second type parameter group(s), L first vectors and R1 third type parameter subgroup(s) that are used to generate R3 merge vector(s), as shown in FIG. 10.

In Embodiment 10, the R1 is not smaller than the R3. The R3 third type parameter subgroup(s) of the R1 third type parameter subgroup(s) is(are) used to generate the R3 merge vector(s). The indexes of the L first vectors are #{0, . . . , L−1}, respectively. The indexes of the R3 second type parameter group(s), the R3 merge vector(s), and the R3 third type parameter subgroup(s) are #{0, . . . , R3−1}, respectively. The second type parameter group, the merge vector, and the third type parameter subgroup having the same index are corresponding to each other.

In Embodiment 10, the merge vector #i is concatenated by the first merge vector #i and the second merge vector #i. The "i" is a non-negative integer smaller than the R3. The first merge vector #i is generated by adding the weighting of the L first vectors respectively by the L first combining coefficients to the L first vectors. The second merge vector #i is generated by adding the weighting of the L first vectors respectively by the L second combining coefficients to the L first vectors. The L first combining coefficients and the first L second type parameters in the second type parameter group #i are in one-to-one correspondence. The L second combining coefficients and the last L second type parameters in the second type parameter group #i are in one-to-one correspondence. The L3 third type parameters in the third type parameter subgroup #i correspond to the L3 non-zero second type parameters in the first L second type parameters of the second type parameter group #i, respectively. The L4 third type parameters in the third type parameter subgroup #i correspond to the L4 non-zero second type parameters in the last L second type parameters of the second type parameter group #i, respectively. The L3 and the L4 are positive integers. The sum of the L3 and the L4 is equal to the number of the third type parameters included in the third type parameter subgroup #i. The L3 first combining coefficients respectively corresponding to the L3 non-zero second type parameters in the L first combining coefficients are respectively equal to the product of the L3 non-zero second type parameters and L3 third type parameters. The L4 second combining coefficients respectively corresponding to the L4 non-zero second type parameters in the L second combining coefficients are respectively equal to the product of the L4 non-zero second type parameters and L4 third type parameters.

In FIG. 10, the L3 non-zero second type parameters are respectively represented by {p(1)i,0, . . . , p(1)i,L3−1}. The L4 non-zero second type parameters are respectively represented by {p(3)i,0, . . . , p(3)i,L4−1}. The L3 third type parameters are respectively represented by {φ(1)i,0, . . . , φ(1)i,L3−1}. The L4 third type parameters are respectively represented by {φ(2)i,0, . . . , φ(2)i,L4−1}. In FIG. 10, {p(2)i,0, . . . , p(2)i,L−L3−1} represents the L−L3 second type parameter(s) in the first L second type parameters of the second type parameter group #i except the L3 non-zero second type parameters, and $\{p(4)i,0, \ldots, p(4)i,L-L4-1\}$ represents the L−L4 second type parameter(s) in the last L second type parameters of the second type parameter group #i except the L4 non-zero second type parameters. In FIG. 10, $\{v(1)0, \ldots, v(1)L3-1\}$ represents the L3 first vectors corresponding to the L3 non-zero second type parameters in the L first vectors, and $\{v(3)0, \ldots, v(3)L4-1\}$ represents the L4 first vectors corresponding to the L4 non-zero second type parameters in the L first vectors.

In one sub-embodiment, all the first combining coefficients of the L first combining coefficients except the L3 first combining coefficients are equal to 0. All the second combining coefficients of the L second combining coefficients except the L4 second combining coefficients are equal to 0.

In one sub-embodiment, the L3 is less than or equal to the number of non-zero second type parameter in the first L second type parameters of the second type parameter group #i. The L4 is less than or equal to the number of non-zero second type parameters in the last L second type parameters of the second type parameter group #i.

In one sub-embodiment, the fourth type parameter group corresponding to the merge vector #i in the R fourth type parameter group(s) in the present disclosure is not a fourth type parameter group of the R2 fourth type parameter group(s) in the present disclosure.

Embodiment 11

Figure 11:
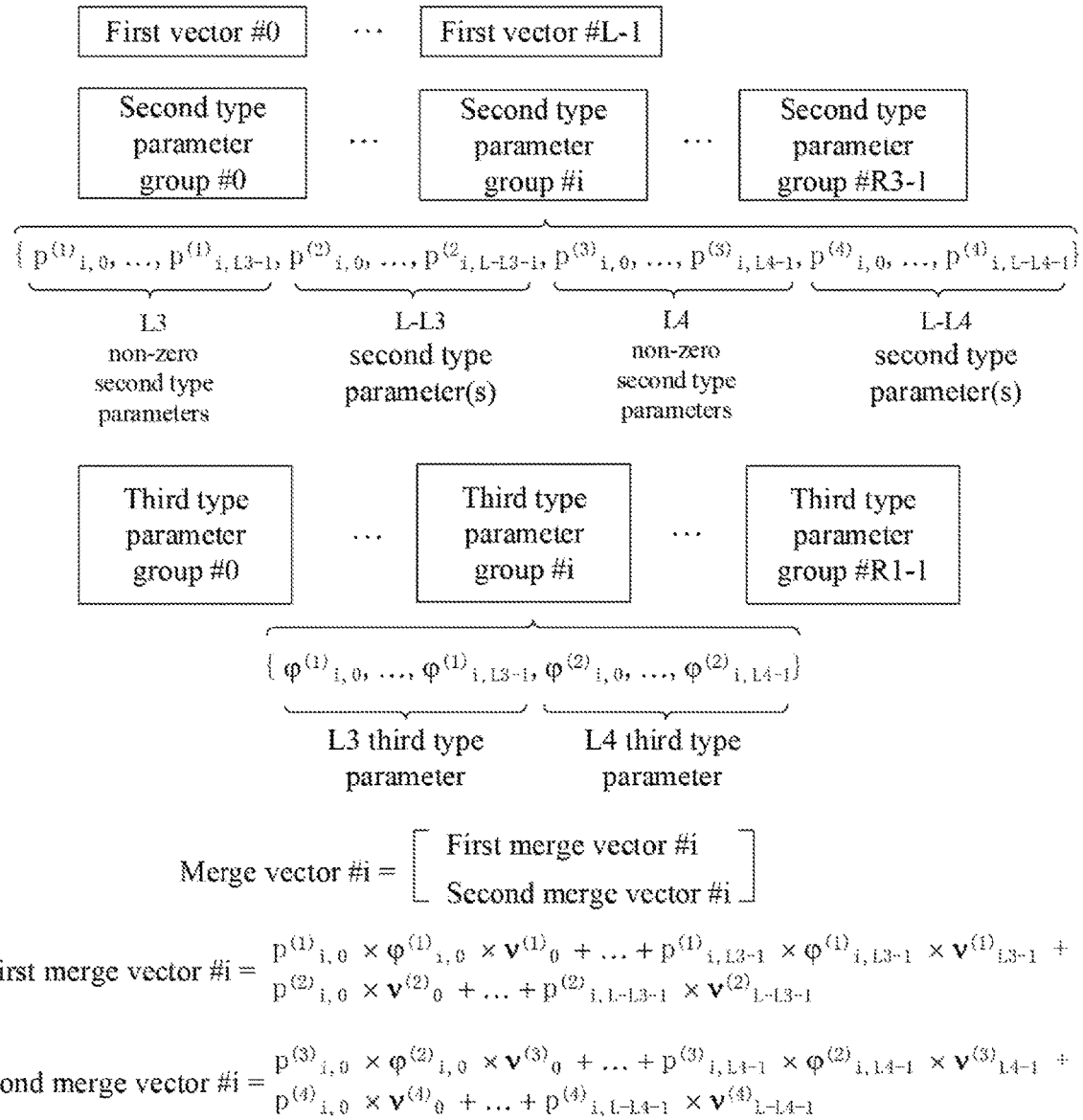
FIG. 11 is a schematic diagram of R3 second type parameter group(s), L first vector(s) and R1 third type parameter subgroup(s) that are used to generate R3 merge vector(s), according to one embodiment of the present disclosure.

Embodiment 11 illustrates a schematic diagram of R3 second type parameter group(s), L first vectors and R1 third type parameter subgroup(s) that are used to generate R3 merge vector(s), as shown in FIG. 11.

The definitions of all the symbols and variables appeared in FIG. 10 of FIG. 11 are the same as those in FIG. 10. In FIG. 11, $\{v^{(2)}_0, v^{(2)}_{L-L3-1}\}$ represents the L−L3 first vectors corresponding to the L−L3 second type parameter(s) of embodiment 10 in the first vector, and $\{v^{(4)}_0, \ldots, v^{(4)}_{L-L4-1}\}$ represents the L−L4 first vectors corresponding to the L−L4 second type parameter(s) of embodiment 10 in the first vector.

In one sub-embodiment, The L−L3 first merge coefficients in the L first combining coefficients in embodiment 10 except the L3 first combining coefficients in embodiment 10 are respectively equal to the L−L3 second type parameter(s) in embodiment 10. The L−L4 second combining coefficients in the L second combining coefficients in Embodiment 10 except the L4 second combining coefficients in embodiment 10 are respectively equal to the L−L4 second type parameter(s) in embodiment 10.

Embodiment 12

Figure 12:
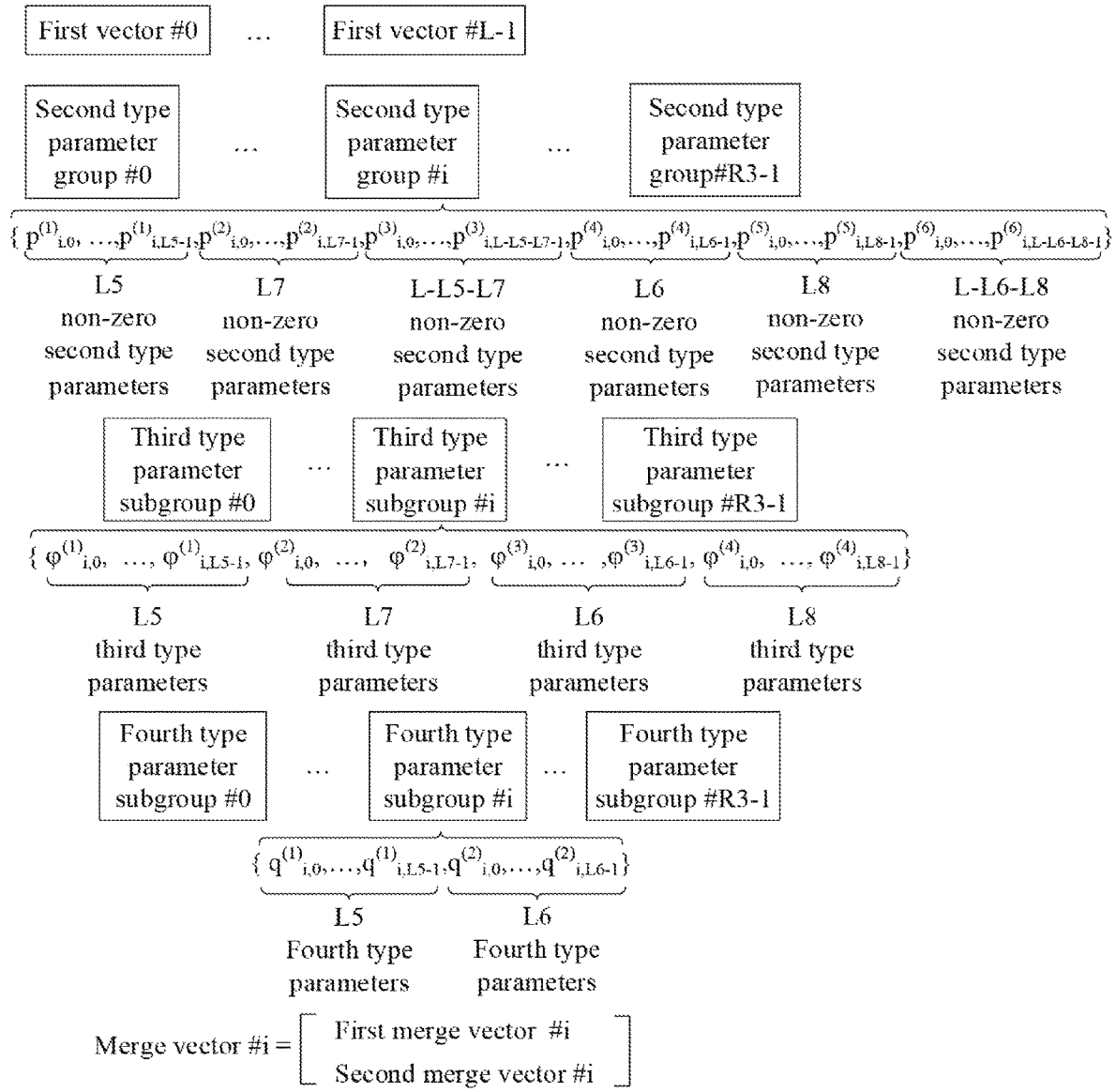
FIG. 12 is a schematic diagram of R3 second type parameter group(s), L first vector(s), R1 third type parameter subgroup(s) and R2 fourth type parameter subgroup(s) that are used to generate R3 merge vector(s), according to one embodiment of the present disclosure.

Embodiment 12 illustrates a schematic diagram of R3 second type parameter group(s), L first vectors, R1 third type parameter subgroup(s), and R2 fourth type parameter subgroup(s) that are used to generate R3 merge vector(s), as shown in FIG. 12.

In Embodiment 12, the R2 is not less than the R3, and the R1 is not less than the R2. The R3 third type parameter subgroup(s) in the R1 third type parameter subgroups and the R3 fourth type parameter subgroup(s) in the R2 fourth type parameter subgroup(s) are used to generate the R3 merge vectors. The indexes of the L first vectors are $\#\{0, \ldots, L-1\}$, respectively. The indexes of the R3 second type parameter group(s), the R3 merge vector(s), the R3 third type parameter subgroup(s), and the R3 fourth type parameter subgroup(s) are $\#\{0, \ldots, R3-1\}$, respectively. The second type parameter group, the merging vector, the third type parameter subgroup and the fourth type parameter subgroup having the same index are corresponding to each other.

In Embodiment 12, the merge vector #i is concatenated by the first merge vector #i and the second merge vector #i. The "i" is a non-negative integer smaller than the R3. The first merge vector #i is generated by adding the weighting of the L first vectors respectively by the L first combining coefficients to the L first vectors. The second merge vector #i is generated by adding the weighting of the L first vectors respectively by the L second combining coefficients to the L first vectors. The L first combining coefficients and the first L second type parameters in the second type parameter group #i are in one-to-one correspondence. The L second combining coefficients and the last L second type parameters in the second type parameter group #i are in one-to-one correspondence. The L5 fourth type parameters in the fourth type parameter subgroup #i correspond to the L5 non-zero second type parameters in the first L second type parameters of the second type parameter group #i, respectively. The L6 fourth type parameters in the fourth type parameter subgroup #i correspond to the L6 non-zero second type parameters in the last L second type parameters of the second type parameter group #i, respectively. The L5 and the L6 are positive integers. The sum of the L5 and the L6 is equal to the number of the fourth type parameters included in the fourth type parameter subgroup #i. The L5 third type parameters in the third type parameter group #i and the L5 non-zero second type parameters is in one-to-one correspondence. The L6 third type parameters in the third type parameter group #i and the L6 non-zero second type parameters is in one-to-one correspondence. In addition to the L5 third type parameters in the third type parameter group #i, the L7 third type parameter(s) and the L7 non-zero second type parameter(s) in the first L second type parameters of the second type parameter group #i is in one-to-one correspondence. In addition to the L6 third type parameters in the third type parameter group #i, the L8 third type parameter(s) and the L8 non-zero second type parameter(s) in the last L second type parameters of the second type parameter group #i is in one-to-one correspondence. The L5 first combining coefficients respectively corresponding to the L5 non-zero second type parameters in the L first combining coefficients are respectively equal to the product of the L5 non-zero second type parameters, the L5 third type parameters and the L5 fourth type parameters. The L6 second combining coefficients respectively corresponding to the L6 non-zero second type parameters in the L second combining coefficients are respectively equal to the product of the L6 non-zero second type parameters, the L6 third type parameters and the L6 fourth type parameters.

In FIG. 12, the L5 non-zero second type parameters, the L6 non-zero second type parameters, the L7 non-zero second type parameter(s), and the L8 non-zero second type parameter(s) are respectively represented by $\{p^{(1)}_{i,0}, \ldots, p^{(1)}_{i,L5-1}\}$, $\{p^{(4)}_{i,0}, \ldots, p^{(4)}_{i,L6-1}\}$, $\{p^{(2)}_{i,0}, \ldots, p^{(2)}_{i,L7-1}\}$ and $\{p^{(5)}_{i,0}, \ldots, p^{(5)}_{i,L8-1}\}$. The L5 third type parameters, the L6 third type parameters, the L7 third type parameter(s), and the L8 third type parameter(s) are respectively represented by $\{\varphi^{(1)}_{i,0}, \ldots, \varphi^{(1)}_{i,L5-1}\}$, $\{\varphi^{(3)}_{i,0}, \ldots, \varphi^{(3)}_{i,L6-1}\}$, $\{\varphi^{(2)}_{i,0}, \ldots, \varphi^{(2)}_{i,L7-1}\}$ and $\{\varphi^{(4)}_{i,0}, \ldots, \varphi^{(4)}_{i,L4-1}\}$. The L5 fourth type parameters and the L6 fourth type parameters are respectively represented by $\{q^{(1)}_{i,0}, \ldots, q^{(1)}_{i,L5-1}\}$ and $\{q^{(2)}_{i,0}, \ldots, q^{(2)}_{i,L6-1}\}$. In FIG. 12, $\{p^{(3)}_{i,0}, \ldots,$ $p^{(3)}_{i,L-L5-L7-1}$} respectively represent the L−L5−L7 second type parameter(s) in the first L second type parameters of the second type parameter group #i except the L5 non-zero second type parameters and the L7 non-zero second type parameter(s). In FIG. 12, {$p^{(6)}_{i,0}$, . . . , $p^{(6)}_{i,L-L6-L8-1}$} respectively represent the L−L6−L8 second type parameter(s) in the last L second type parameters of the second type parameter group #i except the L6 non-zero second type parameters and the L8 non-zero second type parameter(s). In FIG. 12, {$v^{(1)}_0$, . . . , $v^{(1)}_{L5-1}$} represent the L5 first vectors which are one-to-one corresponding to the L5 non-zero second type parameters in the L first vectors. In FIG. 12, {$v^{(4)}_0$, . . . , $v^{(4)}_{L6-1}$} represent the L6 first vectors which are one-to-one corresponding to the L6 non-zero second type parameters in the L first vectors.

In one sub-embodiment, all other first combining coefficients are equal to zero in the L first combining coefficients except the L5 first combining coefficients. All other second combining coefficients are equal to zero in the L second combining coefficients except the L6 second combining coefficients.

In one sub-embodiment, the number of third type parameters included in the third type parameter subgroup #i is smaller than the number of all non-zero second type parameters in the second type parameter group #i.

In one sub-embodiment, the sum of the L5, the L6, the L7 and, the L8 is equal to the number of third type parameters included in the third type parameter subgroup #i.

In one sub-embodiment, the R2 is smaller than the R1.

In one sub-embodiment, the R1 is greater than the R2. The R3 is equal to the R1. R2 third type parameter subgroup(s) in the R1 third type parameter subgroup(s) and the R2 fourth type parameter subgroup(s) are used to generate the R2 merge vector(s) in the R3 merge vector(s). The other R3−R2 merge vector(s) in the R3 merge vector(s) is(are) irrelevant to the R2 fourth type parameter subgroup(s).

In one sub-embodiment, the R2 is equal to the R1.

In one sub-embodiment, the R1, the R2 and the R3 are equal. The R3 merge vector(s) and the R1 third type parameter subgroup(s) are in one-to-one correspondence. The R3 merge vector(s) and the R2 fourth type parameter subgroup(s) are in one-to-one correspondence. Any merge vector of the R3 merge vector(s) is jointly generated by the corresponding third type parameter subgroup(s) and the corresponding fourth type parameter subgroup(s).

In one sub-embodiment, there is at least one given merge vector in the R3 merge vector(s). The given merge vector is jointly generated by a given third type parameter subgroup of the R1 third type parameter subgroups and a given fourth type parameter subgroup of the R2 fourth type parameter subgroups. The number of third type parameters included in the given third type parameter subgroup is not equal to the number of fourth type parameters included in the given fourth type parameter subgroup.

Embodiment 13

Figure 13:
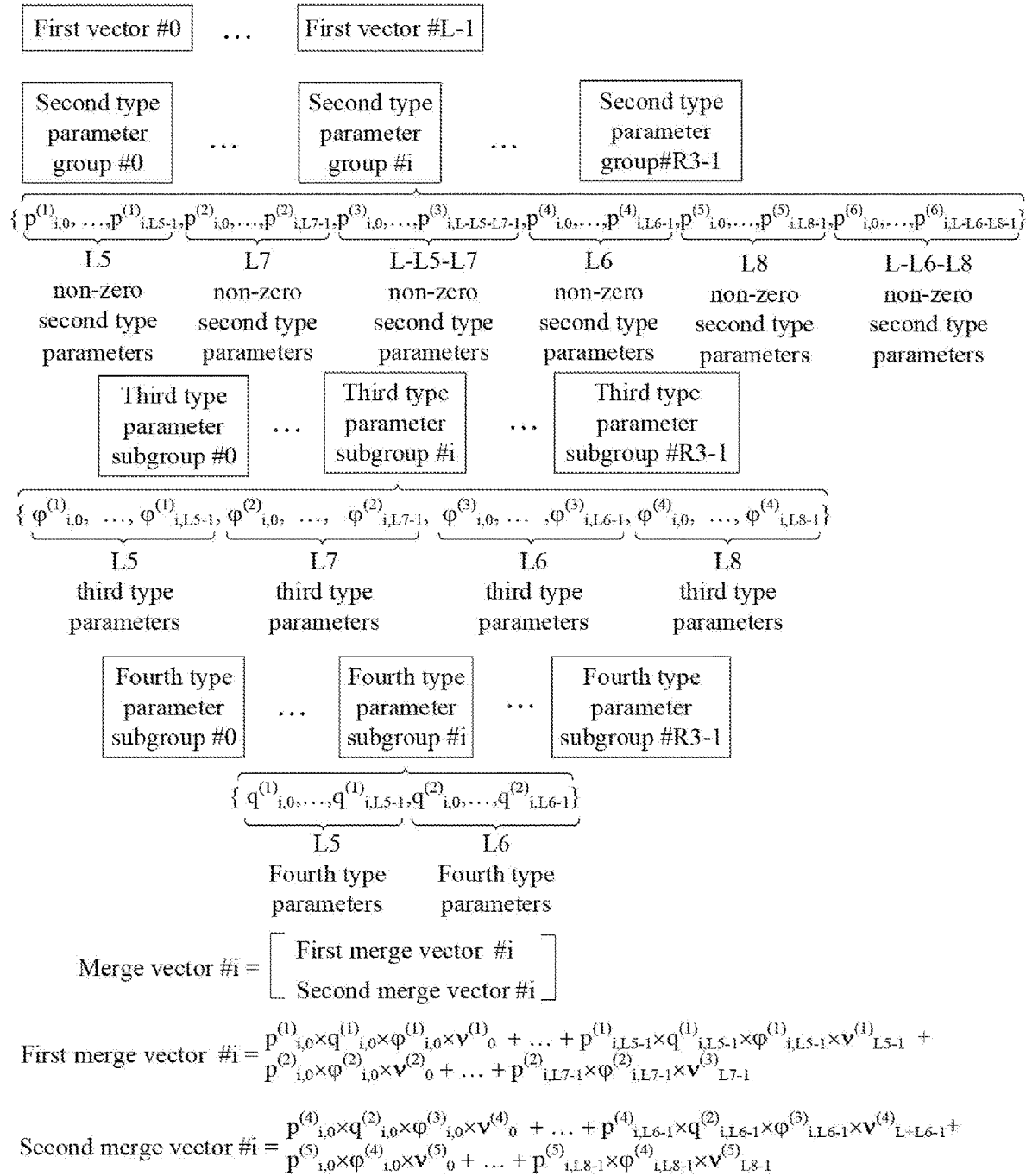
FIG. 13 is a schematic diagram of R3 second type parameter group(s), L first vector(s), R1 third type parameter subgroup(s) and R2 fourth type parameter subgroup(s) that are used to generate R3 merge vector(s), according to one embodiment of the present disclosure.

Embodiment 13 illustrates a schematic diagram of R3 second type parameter group(s), L first vectors, R1 third type parameter subgroup(s), and R2 fourth type parameter subgroup(s) that are used to generate R3 merge vector(s), as shown in FIG. 13.

In FIG. 13, the definitions of all the symbols and variables appearing in FIG. 12 are identical to those in FIG. 12. In FIG. 13, {$v^{(2)}_0$, . . . , $v^{(2)}_{L7-1}$} represents the L7 first vectors one-to-one correspond to the L7 non-zero second type parameter(s) of the embodiment 12 in the L first vectors, and {$v^{(5)}_0$, . . . , $v^{(5)}_{L8-1}$} represents the L8 first vectors one-to-one correspond to the L8 non-zero second type parameter(s) of the embodiment 12 in the L first vectors.

In one sub-embodiment, the L7 first combining coefficients respectively corresponding to the L7 non-zero second type parameter(s) in FIG. 12 among the L first combining coefficients in FIG. 12 are respectively equal to the product of the L7 non-zero second type parameter(s) in FIG. 12 and the L7 third type parameter(s) in FIG. 12. The L8 second combining coefficients respectively corresponding to the L8 non-zero second type parameter(s) in FIG. 12 among the L second combining coefficients in FIG. 12 are respectively equal to the product of the L8 non-zero second type parameter(s) in FIG. 12 and the L8 third type parameter(s) in FIG. 12.

Embodiment 14

Figure 14:
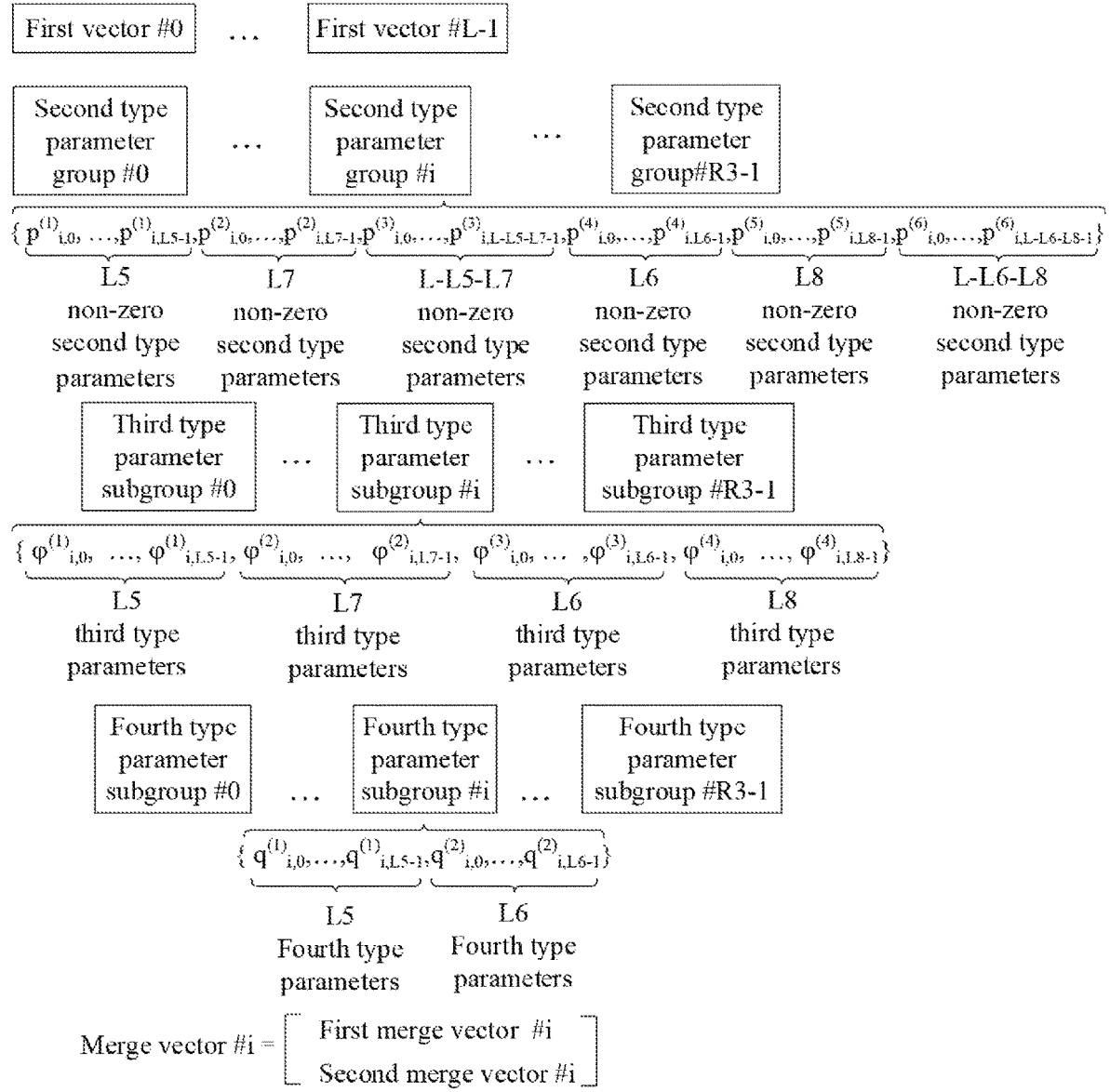
FIG. 14 is a schematic diagram of R3 second type parameter group(s), L first vector(s), R1 third type parameter subgroup(s) and R2 fourth type parameter subgroup(s) that are used to generate R3 merge vector(s), according to one embodiment of the present disclosure.

Embodiment 14 illustrates a schematic diagram of R3 second type parameter group(s), L first vectors, R1 third type parameter subgroup(s), and R2 fourth type parameter subgroup(s) that are used to generate R3 merge vector(s), as shown in FIG. 14.

In FIG. 14, the definitions of all the symbols and variables appearing in FIG. 12 or FIG. 13 are identical to those in FIG. 12 or FIG. 13. In FIG. 14, {$v^{(3)}_0$, . . . , $v^{(3)}_{L-L5-L7-1}$} represents the L−L5−L7 first vectors one-to-one correspond to the L−L5−L7 second type parameter(s) of the embodiment 12 in the L first vectors, and {$v^{(6)}_0$, . . . , $v^{(6)}_{L-L6-L8-1}$} represents the L−L6−L8 first vectors one-to-one correspond to the L−L6−L8 second type parameter(s) of the embodiment 12 in the L first vectors.

In one sub-embodiment, The L−L5−L7 first combining coefficients of the L first merge coefficients in FIG. 12 except the L5 first merge coefficients in FIG. 12 and the L7 first merge coefficients in FIG. 13 are respectively equal to the L−L5−L7 second type parameter(s) in FIG. 12. The L−L6−L8 second combining coefficients of the L second merge coefficients in FIG. 12 except the L6 second merge coefficients in FIG. 12 and the L8 second merge coefficients in FIG. 13 are respectively equal to the L−L6−L8 second type parameter(s) in FIG. 12.

Embodiment 15

Figure 15:
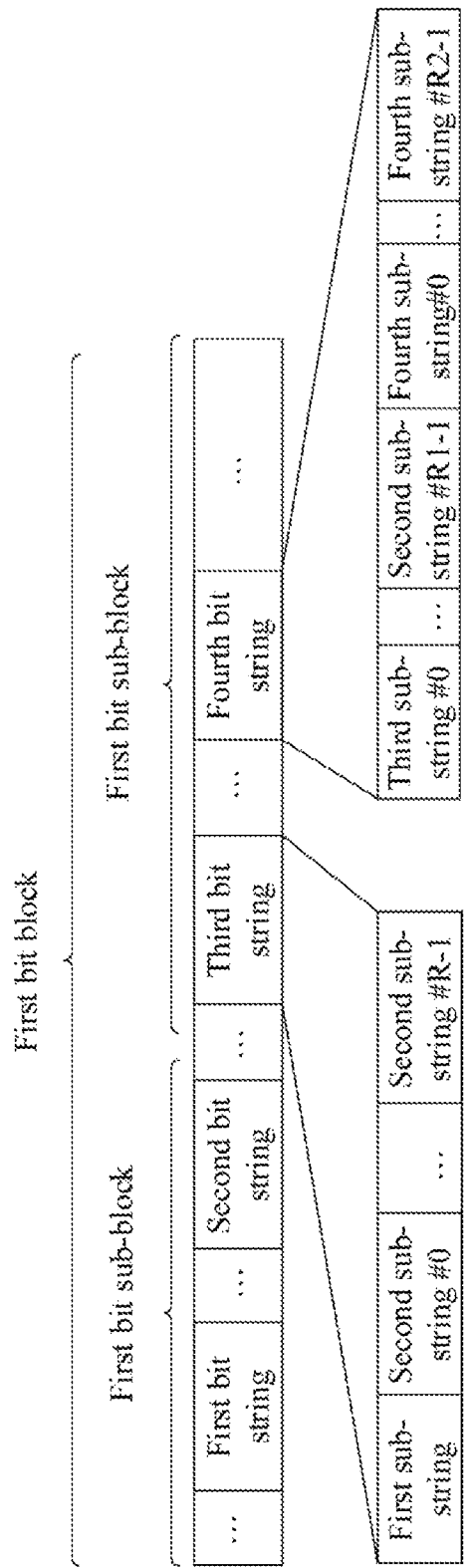
FIG. 15 is a schematic diagram of the content of first bit block in accordance with one embodiment of the present disclosure.

Embodiment 15 illustrates a schematic diagram of the contents of the first bit block, as shown in FIG. 15.

In Embodiment 15, the first bit block comprises a first bit sub-block and a second bit sub-block. The first bit sub-block and the second bit sub-block are separately encoded. The first bit sub-block comprises a first bit string and a second bit string. The first bit string indicates the R in the present disclosure. The second bit string indicates the number of non-zero second type parameters in each second type parameter group of R second type parameter group(s) in the present disclosure. The second bit sub-block comprises a third bit string and a fourth bit string. The third bit string includes a first substring and R second substring(s). The first substring indicates the L first vectors in the present disclosure. The R second substring(s) respectively indicate the R second type parameter group(s). The fourth bit string includes R1 third substring(s) and R2 fourth substring(s). The R1 third substring(s) respectively indicate the R1 third type parameter subgroup(s) in the present disclosure. The R2 fourth substring(s) respectively indicate the R2 fourth type parameter subgroup(s) in the present disclosure. In FIG. 4, the indexes of the R second substring(s) are respectively

{0, ..., R−1}. The indexes of the R1 third substring(s) are respectively #{0, ..., R1−1}. The indexes of the R2 fourth substring(s) are respectively #{0, ..., R2−1}. The first bit string, the second bit string, the third bit string and the fourth bit string are arranged in a front-to-back order in the first bit block. The first substring is located before the R second substring(s) in the first bit block. The R second substring(s) is(are) arranged in a small-to-large order according to the index. The R1 third substring(s) is(are) located in the first bit block before the R2 fourth substring(s). The R1 third substring(s) and the R2 fourth substring(s) are arranged in a small-to-large order, respectively.

In one sub-embodiment, the R is one candidate parameter of the N candidate parameters. The N is a positive integer greater than 1. Any candidate parameter of the N candidate parameters is a positive integer.

In one sub-embodiment of the foregoing embodiment, any candidate parameter of the N candidate parameters is a positive integer not greater than 4.

In one sub-embodiment of the foregoing embodiment, the first bit block indicates the R from the N candidate parameters.

In one sub-embodiment of the foregoing embodiment, the N candidate parameters are configured by high layer signaling.

In one sub-embodiment, the second bit string carries the indicator of the number of non-zero wideband amplitude coefficients, for the specific definition of the number of non-zero wideband amplitude coefficients, refer to section 6.3.2 of 3GPP TS 38.212.

In one sub-embodiment, the first substring indicates $i_{1,1}$ and $i_{1,2}$. The specific definition of $i_{1,1}$ can be found in section 5.2.2.2.3 or 5.2.2.2.4 of 3GPP TS 38.214 (V15.1.0). The specific definition of $i_{1,2}$ can be found in section 5.2.2.2.3 of 3GPP TS 38.214.

In one sub-embodiment, there is one and only one second type parameter which is constantly "1" in any second type parameter of the R second type parameter(s). Any second substring of the R second substring(s) indicates a position of the second type parameter which is constantly "1" in the corresponding second type parameter group.

In one sub-embodiment, the lth second substring of the R second substring(s) indicates $i_{1,3,l}$ and $i_{1,4,l}$. The "1" can be any positive integer not greater than the R. For specific definitions of $i_{1,3,l}$ and $i_{1,4,l}$, refer to section 5.2.2.2.3 or 5.2.2.2.4 in 3GPP TS 38.214 (V15.1.0).

In one sub-embodiment, the first third substring of the R1 third substring(s) indicates $i_{2,1,l}$. The "l" can be any positive integer not greater than the R1. For the specific definition of $i_{2,1,l}$, refer to section 5.2.2.2.3 or section 5.2.2.2.4 of 3GPP TS38.214 (V15.1.0).

In one sub-embodiment, the first fourth substring of the R2 fourth substring(s) indicates $i_{2,2,l}$. The "l" can be any positive integer not greater than the R2. For the specific definition of $i_{2,2,l}$, refer to section 5.2.2.2.3 or section 5.2.2.2.4 of 3GPP TS38.214 (V15.1.0).

In one sub-embodiment, the first bit sub-block is used to determine the number of bits in the second bit sub-block.

In one sub-embodiment, for any given third type parameter group of the R third type parameter groups, the any given third type parameter group includes L1 third type parameters. The L1−1 third type parameters of the L1 third type parameters are respectively carried by the L1−1 third type bit strings. The remaining third type parameter of the L1 third type parameters is constantly "1".

In one sub-embodiment of the foregoing embodiment, all the numbers of bits included in a part of the L1−1 third type bit strings are K1. All the numbers of bits included in another part of the L1−1 third type bit strings are K2. The K1 is greater than the K2.

In one reference embodiment of the foregoing sub-embodiment, the K1 is equal to 3, and the K2 is equal to 2.

In one reference embodiment of the foregoing sub-embodiment, the numbers of a part of the third type bit strings are not greater than K. The K is a positive integer greater than one. For any given L, the K is fixed.

In one reference embodiment of the foregoing sub-embodiment, in the L1 third type parameters, the third type parameter corresponding to any third type bit string in the part of the third type bit string belongs to $\{1, e^{j2\pi/8}, e^{j2\pi/4}, e^{j6\pi/8}, e^{j2\pi/2}, e^{j10\pi/8}, e^{j12\pi/8}, e^{j14\pi/8}\}$.

In the L1 third type parameter, the third type parameter corresponding to any third type bit string in the other part of the third type bit string belongs to $\{1, e^{j2\pi/4}, e^{j\pi}, e^{j6\pi/4}\}$.

In one sub-embodiment, for any given fourth type parameter group of any R fourth type parameter groups, the any given fourth type parameter group includes L5 fourth type parameters. The L5−1 fourth type parameters among the L5 fourth type parameters are respectively carried by L5−1 fourth type bit strings. The remaining one fourth type parameter of the L5 fourth type parameters is constantly "1".

In one sub-embodiment of the foregoing embodiment, any fourth type bit string of the L5−1 fourth type bit strings includes one bit.

In one sub-embodiment, the third type parameter subgroup #x1 and the third type parameter subgroup #x2 are any two third type parameter subgroups of the R1 third type parameter subgroups. The x1 and the x2 are respectively non-negative integers smaller than the R1. The x2 is greater than the x1. The index of the third type parameter group corresponding to the third type parameter subgroup #x1 in the R third type parameter group(s) is smaller than the index of the third type parameter group corresponding to the third type parameter subgroup #x2 in the R third type parameter group(s).

In one sub-embodiment, the fourth type parameter subgroup #y1 and the fourth type parameter subgroup #y2 are any two fourth type parameter subgroups of the R2 fourth type parameter subgroups. The y1 and the y2 are respectively non-negative integers smaller than the R2. The y2 is greater than the y1. The index of the fourth type parameter group corresponding to the fourth type parameter subgroup #y1 in the R fourth type parameter group(s) is smaller than the index of the fourth type parameter group corresponding to the fourth type parameter subgroup #y2 in the R fourth type parameter group(s).

In one sub-embodiment, the first third type parameter is a third type parameter of the R1 third type parameter subgroup(s). The first third type parameter is carried by the first third type bit string. The position of the first third type bit string in the first bit block is related to at least one of the index of the first third type parameter group in the R third type parameter group(s), the size of the second type parameter corresponding to the first third type parameter, and the index of the second type parameter corresponding to the first third type parameter in the belonging second type parameter group. The first third type parameter group is a third type parameter group including the first third type parameter in the R1 third type parameter group(s).

In one sub-embodiment, the first fourth type parameter is a fourth type parameter of the R2 fourth type parameter subgroup(s). The first fourth type parameter is carried by the first fourth type bit string. The position of the first fourth type bit string in the first bit block is related to at least one of the index of the first fourth type parameter group in the R fourth type parameter group(s), the size of the second type parameter corresponding to the first fourth type parameter, and the index of the second type parameter corresponding to the first fourth type parameter in the belonging second type parameter group. The first fourth type parameter group is a fourth type parameter group including the first fourth type parameter in the R2 fourth type parameter group(s).

In one sub-embodiment, the third substring #i of the R1 third substrings comprises Li−1 third type bit strings. The Li third type bit strings respectively carry Li−1 third type parameters of the third type parameter sub-group #i. The "i" is any non-negative integer less than the R1. The "Li" is a positive integer. The indexes of the Li third type bit strings are respectively #{(i,0), . . . , (i,Li−1)}. The index of the third type parameter carried by the third type bit string #(i,x1) in the third type parameter subgroup #i is smaller than the index of the third type parameter carried by the third type bit string #(i,x2) in the third type parameter subgroup #i. The x1 and the x2 are respectively non-negative integers smaller than the Li. The x1 is smaller than the x2.

In one sub-embodiment of the foregoing embodiment, the second type parameter corresponding to the third type parameter carried by the third type bit string #(i,x1) is greater than the second type parameter corresponding to the third type parameter carried by the third type bit string #(i,x2).

In one sub-embodiment of the foregoing embodiment, the index of the second type parameter corresponding to the third type parameter carried by the third type bit string #(i,x1) in the belonging second type parameter group is smaller than the index of the second type parameter corresponding to the third type parameter carried by the third type bit string #(i,x2) in the belonging second type parameter group.

In one sub-embodiment, the fourth substring #j of the R2 fourth substring(s) comprises Lj−1 fourth type bit strings. The Lj fourth type bit strings respectively carry Lj−1 fourth type parameters in the fourth parameter subgroup #j. The "j" is any non-negative integer less than the R2. The "Lj" is a positive integer. The indexes of the Lj fourth type bit strings are respectively #{(j,0), . . . , (j,Lj−1)}. The index of the fourth type parameter carried by the fourth type bit string #(j,y1) in the fourth type parameter subgroup #j is smaller than the index of the fourth type parameter carried by the fourth type bit string #(j,y2) in the fourth type parameter subgroup #j. The y1 and the y2 are respectively non-negative integers smaller than the Lj. The y1 is smaller than the y2.

In one sub-embodiment of the foregoing embodiment, the second type parameter corresponding to the fourth type parameter carried by the fourth type bit string #(j, y1) is greater than the second type parameter corresponding to the fourth type parameter carried by the fourth type bit string #(j,y2).

In one sub-embodiment of the foregoing embodiment, the index of the second type parameter corresponding to the fourth type parameter carried by the fourth type bit string #(j,y1) in the belonging second type parameter group is smaller than the index of the second type parameter corresponding to the fourth type parameter carried by the fourth type bit string #(j,y2) in the belonging second type parameter group.

Embodiment 16

Figure 16:
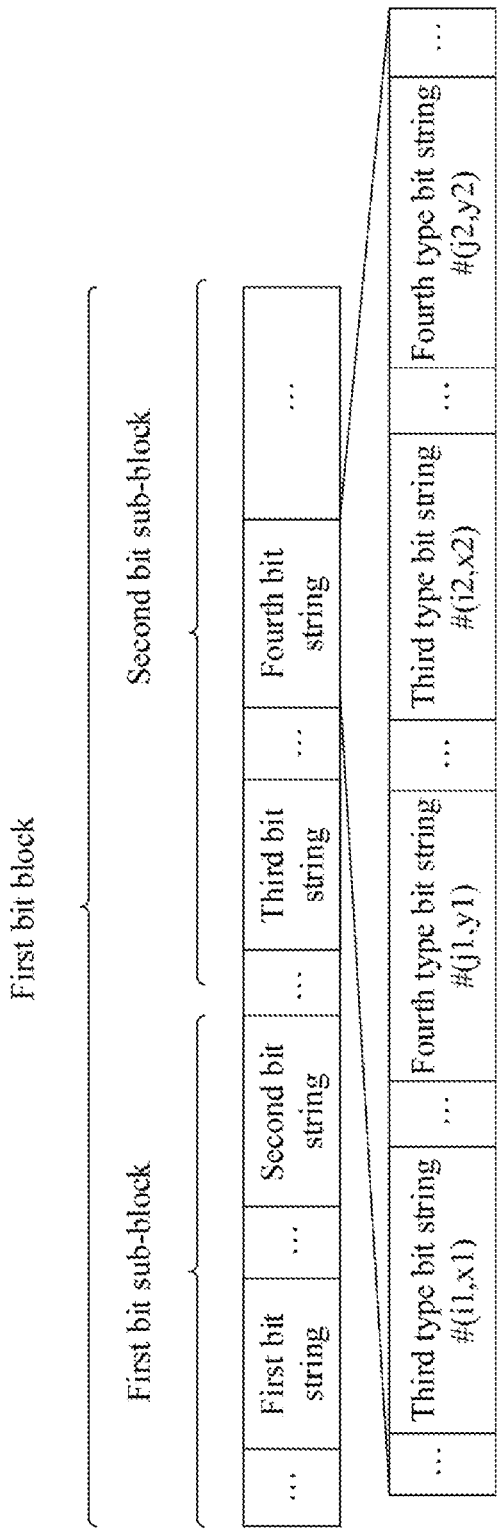
FIG. 16 is a schematic diagram of the content of first bit block in accordance with one embodiment of the present disclosure.

Embodiment 16 illustrates a schematic diagram of the contents of the first bit block; as shown in FIG. 16.

In Embodiment 16, the fourth bit string of embodiment 15 comprises a positive integer number of third type bit string and a positive integer number of fourth type bit string. A third type bit string carries a third type parameter of the R1 third type parameter subgroup(s). A fourth type bit string carries a fourth type parameter of the R2 fourth type parameter subgroups. In FIG. 16, the third type parameter #x in the third type parameter subgroup #i of the R1 third type parameter subgroup(s) is represented by the third type parameter #(i,x). The third type bit string corresponding to the third type parameter #(i,x) is represented by the third type bit string #(i,x). The fourth type parameter #y in the fourth type parameter subgroup #j of the R2 fourth type parameter subgroup(s) is represented by the fourth type parameter #(j, y). The fourth type bit string corresponding to the fourth type parameter #(j,y) is represented by the fourth type bit string #(j,y). The "i" and the "j" are respectively non-negative integers smaller than the R1 and the R2. The "x" is a non-negative integer smaller than the number of third type parameters included in the third type parameter subgroup #i. The "y" is a non-negative integer smaller than the number of the fourth type parameters included in the fourth type parameter subgroup #j.

In one sub-embodiment, there is at least one fourth type bit string and at least one third type bit string. The at least one fourth type bit string in the first bit block is located in front of the at least one third type bit string.

In one sub-embodiment, the fourth type bit string #(j1,y1) in the first bit block is located in front of the third type parameter #(i2,x2). At least one of the following two conditions is satisfied: {The index of the fourth type parameter group to which the fourth type bit string #(j1,y1) belongs in the R fourth type parameter group(s) is smaller than the index of the third type parameter group to which the third type parameter #(i2, x2) belongs in the R third type parameter group; the second type parameter corresponding to the fourth type bit string #(j1,y1) is greater than the second type parameter corresponding to the third type parameter #(i2, x2)}.

Embodiment 17

Figure 17:
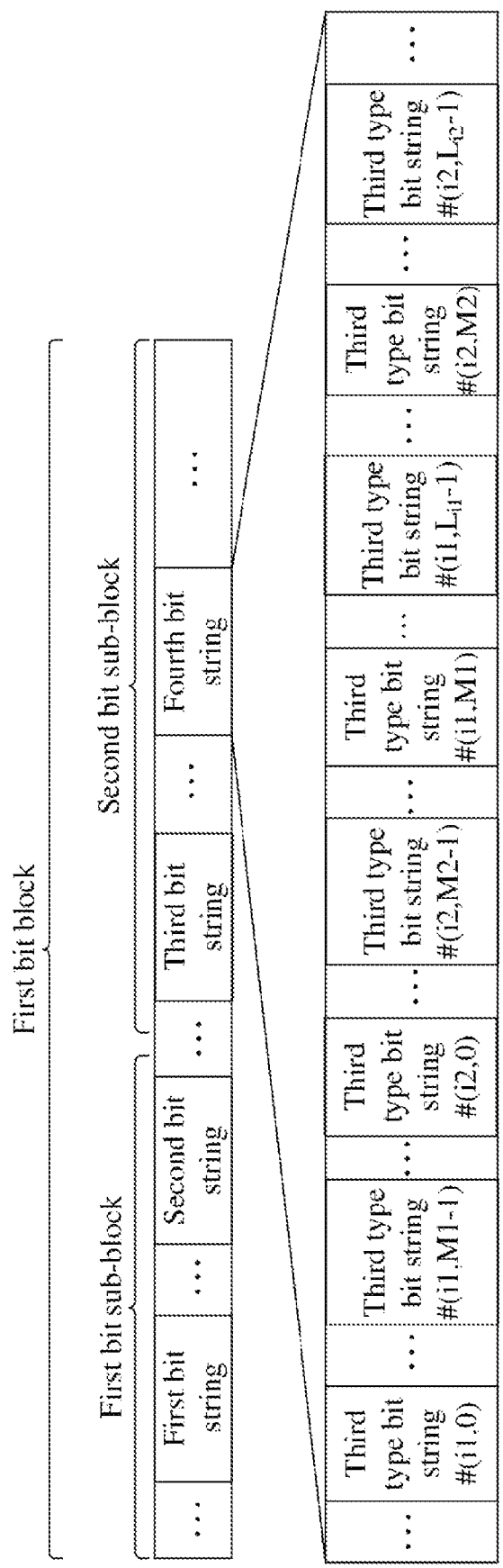
FIG. 17 is a schematic diagram of the content of first bit block in accordance with one embodiment of the present disclosure.

Embodiment 17 illustrates a schematic diagram of the contents of the first bit block; as shown in FIG. 17.

In Embodiment 17, the fourth bit string in Embodiment 15 comprises a positive integer number of third type bit string. A third type bit string carries a third type parameter of the R1 third type parameter subgroup(s). The fourth bit string does not comprise the R2 fourth substring(s) of embodiment 15. In FIG. 17, the definitions of all the symbols and variables appearing in FIG. 16 are identical to those in FIG. 16.

In embodiment 17, the third type parameter subgroup #i1 and the third type parameter subgroup #i2 are respectively any two third type parameter subgroups of the R1 third type parameter subgroup(s). The i1 and the i2 are respectively non-negative integers smaller than the R1. The i2 is greater than the i1. The third type parameter subgroup #i1 includes Li1 third type parameters. The third type parameter subgroup comprises Li2 third type parameters. The Li1 and the Li2 are positive integers, respectively. Li1−1 third type parameters of the Li1 third type parameters are respectively carried by Li1−1 third type bit strings. Li2−1 third type parameters in the Li2 third type parameters are respectively carried by Li2−1 third type bit strings. The first M1 third type parameters of the Li1−1 third type parameters respectively correspond to the first M1 third type bit strings of the Li1−1 third type bit strings. The last Li1−1−M1 third type parameters of the Li1−1 third type parameters respectively correspond to the last Li1−1−M1 third type bit strings of the Li1−1 third type bit strings. The first M2 third type parameters of the Li2−1 third type parameters respectively correspond to the first M2 third type bit strings of the Li2−1 third type bit strings. The last Li2−1−M2 third type parameters of the Li2−1 third type parameters respectively correspond to the last Li2−1−M2 third type bit strings of the Li2−1 third type bit strings. The M1 third type bit strings, the Li1−1−M1 third type bit strings, the M2 third type bit strings, and the Li2−1−M2 third type bit strings are arranged in the order of positional sequence in the first bit block, respectively, The M1 third type bit strings, the M2 third type bit strings, the Li1−1−M1 third type bit strings, and the Li2−1−M2 third type bit strings.

In one sub-embodiment, the M2 is smaller than the M1.

In one sub-embodiment, the M2 is equal to the M1.

In one sub-embodiment, the M1 is not greater than 6.

In one sub-embodiment, the M2 is not greater than 4.

In one sub-embodiment, the M1 is a positive integer not greater than the Li1−1. The M2 is a positive integer not greater than the Li2−1.

In one sub-embodiment, the second type parameter corresponding to any third parameter of the first M1 third type parameters is greater than the second type parameter corresponding to any third type parameter of the post Li1−1−M1 third type parameters. The second type parameter corresponding to any third type parameter of the first M2 third type parameters is greater than the second type parameter corresponding to any third type parameter of the post Li2−1−M2 third type parameters.

In one sub-embodiment, the value of M1 is related to the i1. The value of M2 is related to the i2.

In one sub-embodiment, the M1 and the M2 are respectively configured by high layer signaling.

In one sub-embodiment, for the i1 and the i2 which are arbitrarily given, the M1 and the M2 are respectively default (no configuration required).

In one sub-embodiment, for the R, the i1 and the i2 which are arbitrarily given, the M1 and the M2 are respectively default (no configuration required).

In one sub-embodiment, when the R is not greater than 2, the M1 and the M2 are equal to the Li1−1 and the Li2−1, respectively.

In one sub-embodiment, when the R is greater than 2, the M1 and the M2 are smaller than the Li1−1 and the Li2−1, respectively.

In one sub-embodiment, the fourth type parameter subgroup #j1 and the fourth type parameter subgroup #j2 are respectively any two fourth type parameter subgroups of the R2 fourth type parameter subgroups. The j1 and the j2 are respectively non-negative integers smaller than the R2, and the j2 is greater than the j1. There is at least one fourth type parameter #(j2,y2) in the fourth type parameter subgroup #j2 in front of a fourth type parameter #(j1,y1) in the fourth type parameter subgroup #j1 in the first bit block. The y1 is a non-negative integer smaller than the number of the fourth type parameter included in the fourth type parameter subgroup #j1. The y2 is a non-negative integer smaller than the number of the fourth type parameter included in the fourth type parameter subgroup #j2.

In one sub-embodiment of the foregoing embodiment, the second type parameter corresponding to the fourth type parameter #(j2,y2) is greater than the second type parameter corresponding to the fourth type parameter #(j1,y1).

In one sub-embodiment, the fourth bit string in embodiment 15 is irrelevant to the R2 fourth type parameter subgroup(s).

In one sub-embodiment, high layer parameter SubbandAmplitude is set to OFF. For the specific definition of the high layer parameter SubbandAmplitude, refer to Section 5.2.2.2.3 or Section 5.2.2.2.4 in 3GPP TS38.214.

Embodiment 18

Figure 18:
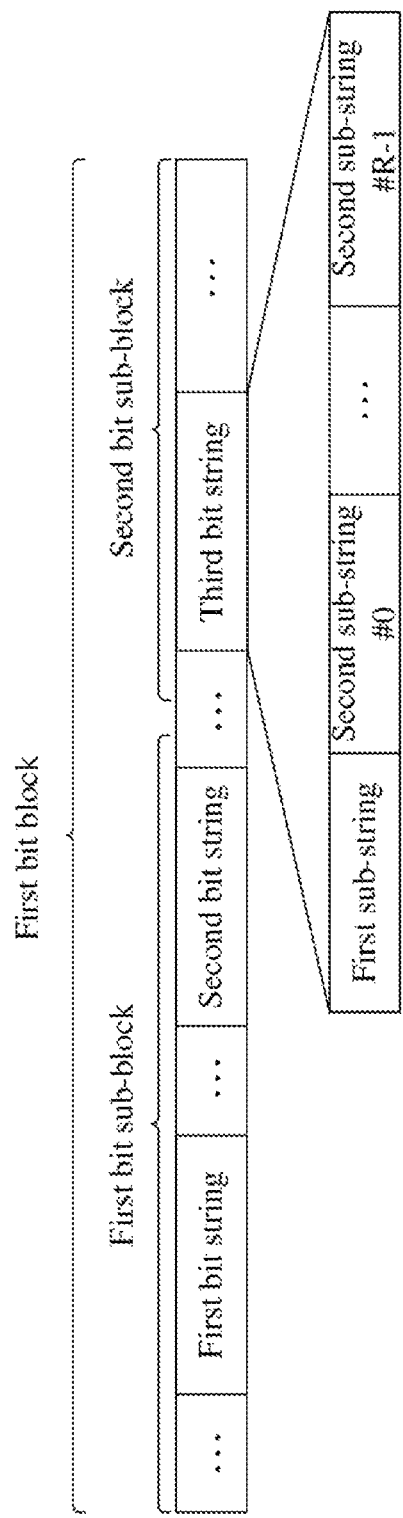
FIG. 18 is a schematic diagram of the content of first bit block in accordance with one embodiment of the present disclosure.

Embodiment 18 illustrates a schematic diagram of the contents of the first bit block, as shown in FIG. 18.

In embodiment 18, the second bit sub-block of Embodiment 15 does not comprise the fourth bit string of embodiment 15.

Embodiment 19

Figure 19:
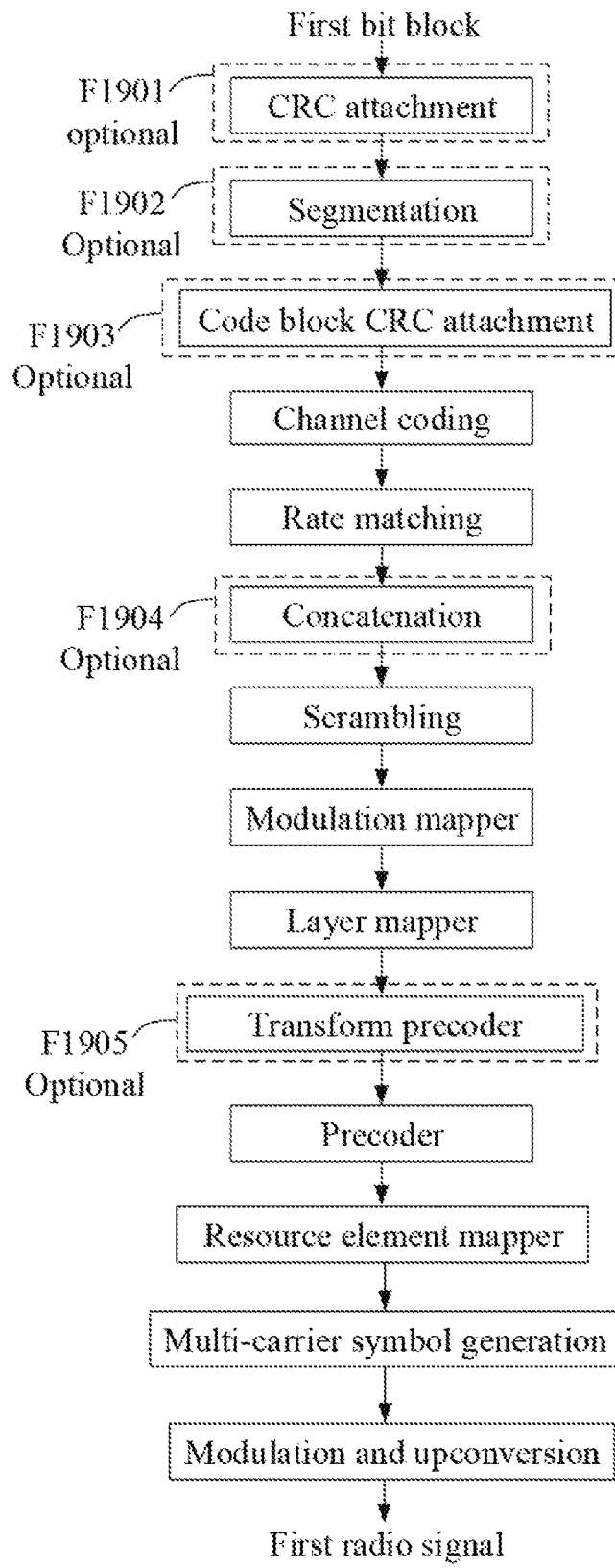
FIG. 19 is a schematic diagram showing a first radio signal carrying a first bit block according to one embodiment of the present disclosure.

Embodiment 19 illustrates a schematic diagram in which a first radio signal carries a first bit block, as shown in FIG. 19.

In Embodiment 19, the first radio signal is an output after all or part of the bits in the first bit block sequentially pass some or all of CRC attachment, segmentation, encoding block level CRC attachment, channel coding, rate matching, concatenation, scrambling, modulation mapper, layer mapper, transform precoder (for generating complex numeric signals), precoding, resource element mapper, multi-carrier symbol generation, modulation and upconversion. Box F1901 to block F1905 in FIG. 9 are respectively optional.

In one sub-embodiment, the first radio signal carrying the first bit block refers to: the first radio signal is an output after all or part of the bits in the first bit block sequentially pass some or all of CRC attachment, segmentation, encoding block level CRC attachment, channel coding, rate matching, concatenation, scrambling, modulation mapper, layer mapper, transform precoder, precoding, resource element mapper, multi-carrier symbol generation, modulation and upconversion.

In one sub-embodiment, the first radio signal carrying the first bit block refers to: the first bit block is used to generate the first radio signal.

In one sub-embodiment, the first bit block only carries UCI.

In one sub-embodiment, the first bit block does not carry uplink data.

Embodiment 20

Figure 20:
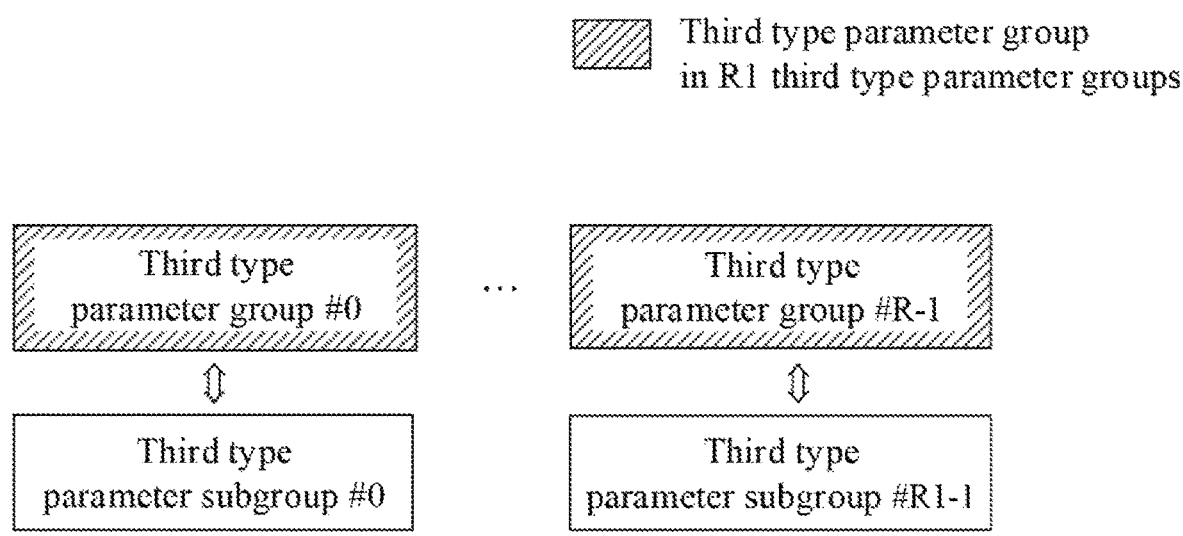
FIG. 20 is a schematic diagram showing the relationship between R third type parameter group(s), R1 third type parameter group(s), and R1 third type parameter subgroup(s) according to one embodiment of the present disclosure.

Embodiment 20 illustrates a schematic diagram of relationship between R third type parameter group(s), R1 third type parameter group(s), and R1 third type parameter subgroup(s), as shown in FIG. 20.

In embodiment 20, the R1 third type parameter subgroup(s) is(are) respectively a subset(subsets) of R1 third type parameter group(s) in R third type parameter group(s). The R1 is equal to the R. Each third type parameter of the R third type parameter group(s) comprises a positive integer number of third type parameters. The R third type parameter group(s) and the R second type parameter group(s) in the present disclosure are in one-to-one correspondence. A number of third type parameters included in any one of the R third type parameter group(s) is equal to a number of non-zero second type parameters in a corresponding second type parameter group. All the third type parameters in any one of the R third type parameter group(s) and all the non-zero second type parameters in the corresponding second type parameter group are in one-to-one correspondence. In the present disclosure, whether a reference third type parameter belongs to the R1 third type parameter subgroup(s) is associated with at least one of an index of a reference third type parameter group in the R third type parameter group(s) and a magnitude of a second type parameter corresponding to the reference third type parameter. In FIG. 20. The indexes of the R third type parameter group(s) are respectively #{0, ..., R−1}. The indexes of the R1 third type parameter subgroup(s) are respectively #{0, ..., R1−1}. A box filled with oblique lines indicates a third type parameter group of the R1 third type parameter groups.

In one sub-embodiment, for any given third type parameter group of the R third type parameter group(s), the first parameter and the second parameter are any two third type parameters of any given third type parameter group. The index of the first parameter in any given third type parameter group is smaller than the index of the second parameter in any given third type parameter group. The second type parameter corresponding to the first parameter is greater than the second type parameter corresponding to the second parameter.

In one sub-embodiment, for any given third type parameter group of the R third type parameter group(s), the first parameter and the second parameter are any two third type parameters of any given third type parameter group. The index of the first parameter in any given third type parameter group is smaller than the index of the second parameter in any given third type parameter group. The index of the second type parameter corresponding to the first parameter in the belonging second type parameter group is smaller than the index of the second type parameter corresponding to the second parameter in the belonging second type parameter group.

In one sub-embodiment, the R1 is equal to the R.

In one sub-embodiment, the R1 is equal to the R. The number of the third type parameters included in the at least one third type parameter subgroup of the R1 third type parameter subgroups is smaller than the number of third type parameters included in the corresponding third type parameter group.

In one sub-embodiment, the number of the third type parameters included in any third type parameter subgroup of the R1 third type parameter subgroup(s) is smaller than the number of third type parameters included in the corresponding third type parameter group.

In one sub-embodiment, in the R1 third type parameter subgroup(s), the number of third type parameters included in at least one third type parameter subgroup is smaller than the number of third type parameters included in the corresponding third type parameter group.

In one sub-embodiment, in the R1 third type parameter subgroup(s), the number of third type parameters included in at least one third type parameter subgroup is equal to the number of third type parameters included in the corresponding third type parameter group.

In one sub-embodiment, the R1 is equal to the R, whether the reference third type parameter belongs to the R1 third type parameter subgroup(s) is associated with the latter of an index of a reference third type parameter group in the R third type parameter group(s) and a magnitude of a second type parameter corresponding to the reference third type parameter.

In one sub-embodiment, the given third type parameter subgroup is a third type parameter subgroup of the R1 third type parameter subgroup(s). The number of third type parameters included in the given third type parameter subgroup is smaller than the number of the third type parameters included in the third type parameter group corresponding to the given third type parameter subgroup. The second type parameter corresponding to any third type parameter in the given third type parameter subgroup is greater than the second type parameter corresponding to any third type parameter that does not belong to the given third type parameter subgroup in the third type parameter group corresponding to the given third type parameter subgroup.

In one sub-embodiment, any third type parameter of the R third type parameter group(s) is a complex number whose module is one.

In one sub-embodiment, any third type parameter of the R third type parameter group(s) belongs to $\{1, e^{j2\pi/N_{PSK}}, \ldots, e^{j2\pi(N_{PSK}-1)/N_{PSK}}\}$. The $N_{PSK}$ is a positive integer, and the $N_{PSK}$ is configured by high layer signaling.

In one sub-embodiment of the foregoing embodiment, the $N_{PSK}$ belongs to $\{4,8\}$.

In one sub-embodiment, there is one and only one third type parameter constantly "1" in any third type parameter group of the R third type parameter group(s).

In one sub-embodiment of the foregoing embodiment, the first bit block in the present disclosure indicates the location of the third type parameter that is constantly "1" in each third parameter group of the R third type parameter group(s).

In one sub-embodiment of the foregoing embodiment, there is one and only one second type parameter constantly "1" in any second type parameter group of the R second type parameter group(s). The third type parameter constantly 1 in any third type parameter group of the R third type parameter group(s) corresponds to the second type parameter constantly 1 in the corresponding second type parameter group.

In one sub-embodiment, for any given third type parameter subgroup of the R1 third type parameter subgroup(s), the any given third type parameter subgroup comprises L1 third type parameters. The L1 third type parameters and the largest L1 non-zero second type parameters in the second type parameter group corresponding to any given third type parameter subgroup are in one-to-one correspondence. The L1 is a positive integer not greater than the number of non-zero second type parameters in the second type parameter group corresponding to any given third type parameter subgroup.

In one sub-embodiment, when the index of the reference third type parameter group of the R third type parameter group(s) is not greater than the second rank threshold and the second type parameter corresponding to the reference third type parameter is one second type parameter of largest B1 non-zero second type parameters in reference second type parameter group, the reference third type parameter belongs to the R1 third type parameter subgroup(s). When the index of the reference third type parameter group of the R third type parameter group(s) is not greater than the second rank threshold and the second type parameter corresponding to the reference third type parameter is not one second type parameter of largest B1 non-zero second type parameters in reference second type parameter group, the reference third type parameter does not belong to the R1 third type parameter subgroup(s). When the index of the reference third type parameter group of the R third type parameter group(s) is greater than the second rank threshold and the second type parameter corresponding to the reference third type parameter is one second type parameter of largest B2 non-zero second type parameters in reference second type parameter group, the reference third type parameter belongs to the R1 third type parameter subgroup(s). When the index of the reference third type parameter group of the R third type parameter group(s) is greater than the second rank threshold and the second type parameter corresponding to the reference third type parameter is not one second type parameter of largest B2 non-zero second type parameters in reference second type parameter group, the reference third type parameter does not belong to the R1 third type parameter subgroup(s). The reference second type parameter group is the second type parameter group corresponding to the reference third type parameter group. The second rank threshold is a positive integer greater than 1. The B1 and the B2 are positive integers, respectively.

In one sub-embodiment of the foregoing embodiment, the B1 is greater than the B2.

In one sub-embodiment of the foregoing embodiment, the B1 is equal to the B2.

In one sub-embodiment of the foregoing embodiment, the first radio signal comprises a first sub-signal. The first sub-signal carries the first bit block. The second rank threshold, the selected values of B1 and B2 satisfy at least one of the following conditions: The ratio between the number of REs (resource elements) occupied by the first sub-signal and the number of REs occupied by the first radio signal is not greater than a first ratio threshold. The code rate corresponding to the first sub-signal is not higher than the first code rate threshold. The first ratio threshold is a positive real number not greater than 1. The first code rate threshold is a positive real number.

In one sub-embodiment, the R1 third type parameter group(s) is(are) indicated by PMI.

In one sub-embodiment, the R1 third type parameter group(s) is(are) indicated by PMI subband information.

Embodiment 21

Figure 21:
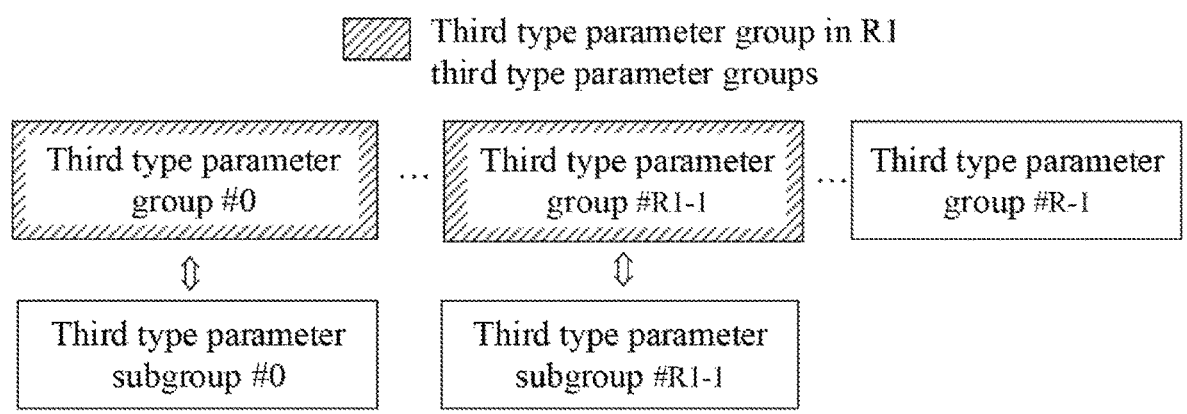
FIG. 21 is a schematic diagram showing the relationship between R third type parameter group(s), R1 third type parameter group(s), and R1 third type parameter subgroup(s) according to one embodiment of the present disclosure.

Embodiment 21 illustrates a schematic diagram of relationship between R third type parameter group(s), R1 third type parameter group(s), and R1 third type parameter subgroup(s), as shown in FIG. 21.

In embodiment 21, the R1 is smaller than the R. The definitions of all the symbols and variables appeared in FIG. 20 of FIG. 21 are the same as those in FIG. 20.

In one sub-embodiment, the R1 is smaller than the R.

In one sub-embodiment, the R1 is smaller than the R. The number of the third type parameters included in any third type parameter subgroup of the R1 third type parameter subgroup(s) is equal to the number of third type parameters included in the corresponding third type parameter group.

In one sub-embodiment, whether a reference third type parameter belongs to the R1 third type parameter subgroup(s) is associated with the former of an index of a reference third type parameter group in the R third type parameter group(s) and a magnitude of a second type parameter corresponding to the reference third type parameter.

In one sub-embodiment, the R1 is smaller than the R. The number of the third type parameters included in at least one third type parameter subgroup of the R1 third type parameter subgroup(s) is smaller than the number of third type parameters included in the corresponding third type parameter group.

In one sub-embodiment, whether a reference third type parameter belongs to the R1 third type parameter subgroup(s) is associated with both the former and the latter of an index of a reference third type parameter group in the R third type parameter group(s) and a magnitude of a second type parameter corresponding to the reference third type parameter.

In one sub-embodiment, the R1 is smaller than the R. Whether a reference third type parameter group belongs to the R1 third type parameter group(s) is associated with an index of a reference third type parameter group in the R third type parameter group(s).

In one sub-embodiment, the R1 third type parameter group(s) is(are) the R1 third type parameter group(s) of the R third type parameter group(s) having the smallest R1 index(indexes).

In one sub-embodiment, the indexes of the R1 third type parameter group(s) in the R third type parameter group(s) are 0 to the R1–1, respectively.

Embodiment 22

Figure 22:
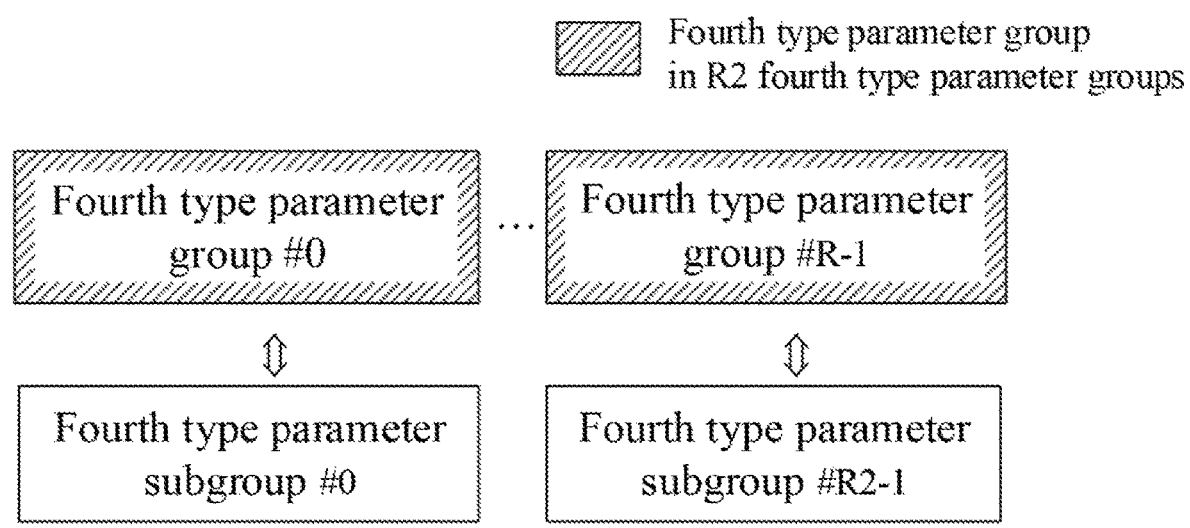
FIG. 22 is a schematic diagram showing the relationship between R fourth type parameter group(s), R2 fourth type parameter group(s), and R2 fourth type parameter subgroup(s) according to one embodiment of the present disclosure.

Embodiment 22 illustrates a schematic diagram of relationship between R fourth type parameter group(s), R2 fourth type parameter group(s), and R2 fourth type parameter subgroup(s), as shown in FIG. 22.

In embodiment 22, the R2 fourth type parameter subgroup(s) is(are) respectively a subset(subsets) of R2 fourth type parameter group(s) in R fourth type parameter group(s). The R2 is equal to the R. Each of the R fourth type parameter group(s) comprises a positive integer number of fourth type parameters. The R fourth type parameter group(s) and the R second type parameter group(s) of the present disclosure are in one-to-one correspondence. The number of the fourth type parameters included in any one of the R fourth type parameter group(s) is equal to the number of non-zero second type parameters in the corresponding second type parameter group; all the fourth type parameters in any one of the R fourth type parameter group(s) and all the non-zero second type parameters in the corresponding second type parameter group are in one-to-one correspondence. Whether a reference fourth type parameter of the present disclosure belongs to the R2 fourth type parameter subgroup(s) is associated with at least one of an index of a reference fourth type parameter group of the present disclosure in the R fourth type parameter group(s) and a magnitude of a second type parameter corresponding to the reference fourth type parameter. In FIG. 22, the indexes of the R fourth type parameter group(s) are respectively #{0, . . . , R–1}. The indexes of the R2 fourth type parameter subgroup(s) are respectively #{0, . . . , R2–1}. A box filled with oblique lines indicates a third type parameter group of the R2 fourth type parameter groups.

In one sub-embodiment, for any given fourth type parameter group of any R fourth type parameter groups, the third parameter and the fourth parameter are any two fourth type parameters of any given fourth type parameter group. The index of the third parameter in any given fourth type parameter group is smaller than the index of the fourth parameter in any given fourth type parameter group. The second parameter corresponding to the third parameter is greater than the second parameter corresponding to the fourth parameter.

In one sub-embodiment, for any given fourth type parameter group of any R fourth type parameter groups, the third parameter and the fourth parameter are any two fourth type parameters of any given fourth type parameter group. The index of the third parameter in any given fourth type parameter group is smaller than the index of the fourth parameter in any given fourth type parameter group. The index of the second type parameter corresponding to the third parameter in the belonging second type parameter group is smaller than the index of the second type parameter corresponding to the fourth parameter in the belonging second type parameter group.

In one sub-embodiment, the R2 is equal to the R.

In one sub-embodiment, the number of the fourth type parameters included in at least one fourth type parameter subgroup of the R2 fourth type parameter subgroup(s) is smaller than the number of the fourth type parameters included in the corresponding fourth type parameter group.

In one sub-embodiment, the number of the fourth type parameters included in at least one fourth type parameter subgroup of the R2 third type parameter subgroup(s) is equal to the number of the fourth type parameters included in the corresponding fourth type parameter group.

In one sub-embodiment, the R2 is equal to the R. Whether the reference fourth type parameter belongs to the R2 fourth type parameter subgroup(s) is only associated with the latter of an index of the reference fourth type parameter group in the R fourth type parameter group(s) and the size magnitude of the second type parameter corresponding to the reference fourth type parameter.

In one sub-embodiment, the given fourth type parameter subgroup is a fourth type parameter subgroup of the R2 fourth type parameter subgroups. The number of fourth type parameters included in the given fourth type parameter subgroup is smaller than the number of the fourth type parameters included in the fourth type parameter group corresponding to the given fourth type parameter subgroup. The second type parameter corresponding to any fourth type parameters in the given fourth type parameter subgroup is greater than the second type parameter corresponding to any fourth type parameter of the fourth type parameter group corresponding to the given fourth type parameter subgroup that does not belong to the given fourth type parameter subgroup.

In one sub-embodiment, any fourth type parameter of the R fourth type parameter groups is a positive real number not greater than one.

In one sub-embodiment, any fourth type parameter of the R fourth type parameter group(s) belongs to $\{1, \sqrt{1/2}\}$.

In one sub-embodiment, there is one and only one fourth type parameter which is constantly "1" in any fourth type parameter group of the R fourth type parameter group(s).

In one sub-embodiment of the foregoing embodiment, the first bit block in the present disclosure indicates the position of the fourth type parameter which is constantly "1" in each fourth parameter group of the R fourth type parameter group(s).

In one sub-embodiment of the foregoing embodiment, there is one and only one second type parameter which is constantly "1" in any second type parameter group of the R second type parameter group(s). The fourth type parameter which is constantly "1" in any fourth type parameter group of the R fourth type parameter group(s) corresponds to the second type parameter which is constantly "1" in the corresponding second type parameter group.

In one sub-embodiment, for any given fourth type parameter subgroup of the R2 fourth type parameter subgroup(s), the any given fourth type parameter subgroup comprises L5 fourth type parameters. The L5 fourth type parameters and the largest L5 non-zero second type parameter in the second type parameter group corresponding to the any given fourth type parameter subgroup are in one-to-one correspondence.

In one sub-embodiment, when the index of the reference fourth type parameter group of the R fourth type parameter group(s) is not greater than the third rank threshold and the second type parameter corresponding to the reference fourth type parameter is one of the largest B3 non-zero second type parameters in reference second type parameter group, the reference fourth type parameter belongs to the R2 fourth type parameter subgroup(s). When the index of the reference fourth type parameter group of the R fourth type parameter group(s) is not greater than the third rank threshold and the second type parameter corresponding to the reference fourth type parameter is not one of the largest B3 non-zero second type parameters in reference second type parameter group, the reference fourth type parameter does not belong to the R2 fourth type parameter subgroup(s). When the index of the reference fourth type parameter group of the R fourth type parameter group(s) is greater than the third rank threshold and the second type parameter corresponding to the reference fourth type parameter is one of the largest B4 non-zero second type parameters in reference second type parameter group, the reference fourth type parameter belongs to the R2 fourth type parameter subgroup(s). When the index of the reference fourth type parameter group of the R fourth type parameter group(s) is greater than the third rank threshold and the second type parameter corresponding to the reference fourth type parameter is not one of the largest B4 non-zero second type parameters in reference second type parameter group, the reference fourth type parameter does not belong to the R2 fourth type parameter subgroup(s). The reference second type parameter group is the second type parameter group corresponding to the reference fourth type parameter group. The third rank threshold is a positive integer greater than 1. The B3 and the B4 are positive integers, respectively.

In one sub-embodiment of the foregoing embodiment, the B3 is larger than the B4.

In one sub-embodiment of the foregoing embodiment, the B3 is equal to the B4.

In one sub-embodiment of the foregoing embodiment, the first radio signal comprises a first sub-signal. The first sub-signal carries the first bit block. The third rank threshold, the selected values of B3 and B4 satisfy at least one of the following conditions: The ratio between the number of REs occupied by the first sub-signal and the number of REs occupied by the first radio signal is not greater than a first ratio threshold. The code rate corresponding to the first sub-signal is not higher than the first code rate threshold. The first ratio threshold is a positive real number not greater than 1. The first code rate threshold is a positive real number.

In one sub-embodiment, the R2 fourth type parameter group(s) is(are) indicated by PMI.

In one sub-embodiment, the R2 fourth type parameter group(s) is(are) indicated by PMI subband information.

Embodiment 23

Figure 23:
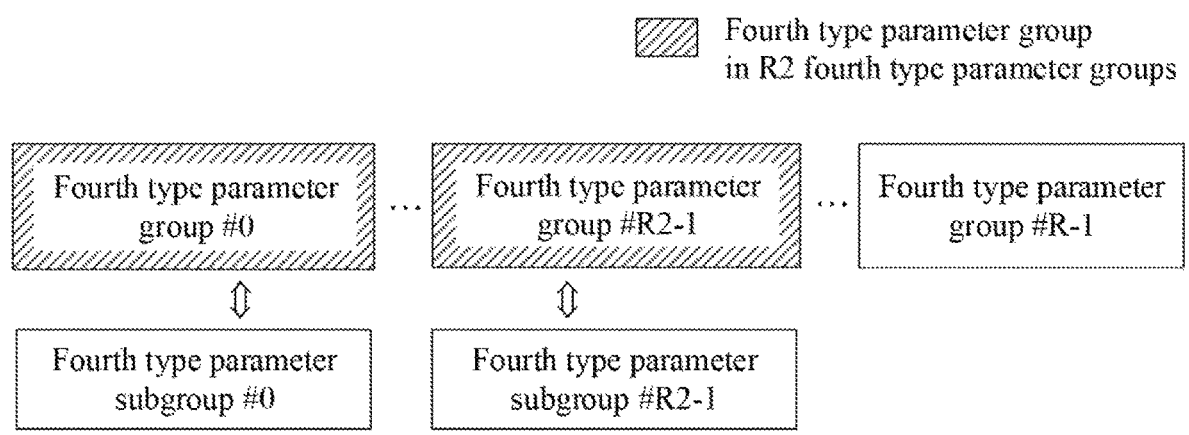
FIG. 23 is a schematic diagram showing the relationship between R fourth type parameter group(s), R2 fourth type parameter group(s), and R2 fourth type parameter subgroup(s) according to one embodiment of the present disclosure.

Embodiment 23 illustrates a schematic diagram of the relationship between R fourth type parameter group(s), R2 fourth type parameter group(s), and R2 fourth type parameter subgroup(s), as shown in FIG. 23.

In embodiment 23, the R2 is smaller than the R. The definitions of all the symbols and variables appeared in FIG. 22 of FIG. 23 are the same as those in FIG. 22.

In one sub-embodiment, the R2 is smaller than the R.

In one sub-embodiment, the R2 is smaller than the R. The number of the fourth type parameters included in any fourth type parameter of the R2 fourth type parameter subgroup(s) is equal to the number of the fourth type parameters included in the corresponding fourth type parameter group.

In one sub-embodiment, whether a reference fourth type parameter belongs to the R2 fourth type parameter subgroup(s) is only associated with the former of an index of a reference fourth type parameter group in the R fourth type parameter group(s) and the size magnitude of the second type parameter corresponding to the reference fourth type parameter.

In one sub-embodiment, the R2 is smaller than the R. The number of the fourth type parameters included in the at least one fourth type parameter subgroup of the R2 fourth type parameter subgroup(s) is smaller than the number of the fourth type parameters included in the corresponding fourth type parameter group.

In one sub-embodiment, whether the reference fourth type parameter belongs to the R2 fourth type parameter subgroup(s) is associated with both the former and the latter of an index of the reference fourth type parameter group in the R fourth type parameter group(s) and the size magnitude of the second type parameter corresponding to the reference fourth type parameter.

In one sub-embodiment, the R2 is smaller than the R. Whether the reference fourth type parameter belongs to the R2 fourth type parameter subgroup(s) is associated with the index of a reference fourth type parameter group in the R fourth type parameter group(s).

In one sub-embodiment, the R2 fourth type parameter group(s) is(are) the R2 fourth type parameter group(s) of the R fourth type parameter group(s) having the smallest R2 index(indexes).

In one sub-embodiment, the indexes of the R2 fourth type parameter group(s) in the R fourth type parameter group(s) are 0 to the R2−1, respectively.

In one sub-embodiment, the first bit block in the present disclosure indicates the R1 third type parameter subgroup(s) and the R2 fourth type parameter subgroup(s) in the present disclosure. The R1 is smaller than the R, or, the number of the third type parameters included in the at least one third type parameter subgroup of the R1 third type parameter subgroup(s) is smaller than the number of third type parameters included in the corresponding third type parameter group.

Embodiment 24

Figure 24:
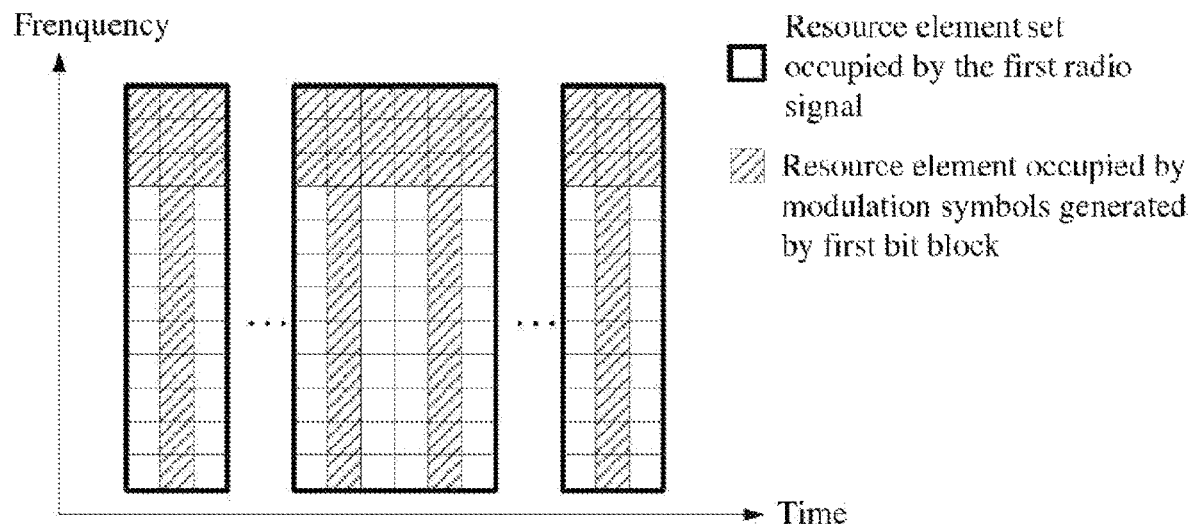
FIG. 24 is a schematic diagram showing resource element occupied by modulation symbols generated by a first bit block in a time-frequency chart according to one embodiment of the present disclosure.

Embodiment 24 illustrates a schematic diagram showing resource element occupied by modulation symbols generated by a first bit block in a time-frequency chart, as shown in FIG. 24.

In Embodiment 24, the first radio signal comprises a first sub-signal. The first sub-signal is generated by a modulation symbol corresponding to the first bit block. In FIG. 24, the boxes having thick solid border lines indicate the set of REs occupied by the first radio signal. The squares filled with the oblique lines indicate the REs occupied by the first sub-signal.

In one sub-embodiment, the ratio between the number of REs occupied by the first sub-signal and the number of REs occupied by the first radio signal is not greater than a first ratio threshold. The first ratio threshold is a positive real number not greater than 1

In one sub-embodiment of the foregoing embodiment, the first ratio threshold belongs to {0.5,0.65,0.8,1}.

In one sub-embodiment of the foregoing embodiment, the first ratio threshold is configured by high layer signaling.

In one sub-embodiment, the code rate corresponding to the first sub-signal is not higher than the first code rate threshold. The first code rate threshold is a positive real number.

In one sub-embodiment of the foregoing embodiment, the code rate corresponding to the first sub-signal refers to: the ratio of the number of bits included in the first bit block to the first value. The first value is the product of the number of REs occupied by the first sub-signal and the number of antenna ports transmitting the first sub-signal.

In one sub-embodiment of the foregoing embodiment, the code rate corresponding to the first sub-signal is determined by the MCS of the first sub-signal.

In one sub-embodiment, the first radio signal comprises a second sub-signal. The second sub-signal carries uplink data. The first code rate threshold is related to the MCS corresponding to the second sub-signal.

In one sub-embodiment of the foregoing embodiment, the first sub-signal only carries UCI.

In one sub-embodiment of the foregoing embodiment, the first sub-signal does not carry uplink data.

In one sub-embodiment, the first radio signal does not comprise a reference signal. The reference signal comprises one or all of DMRS (DeModulation Reference Signals) and PTRS (Phase Error Tracking Reference Signals).

In one sub-embodiment, one RE occupies one multi-carrier symbol in the time domain and one sub-carrier in the frequency domain.

Embodiment 25

Figure 25:
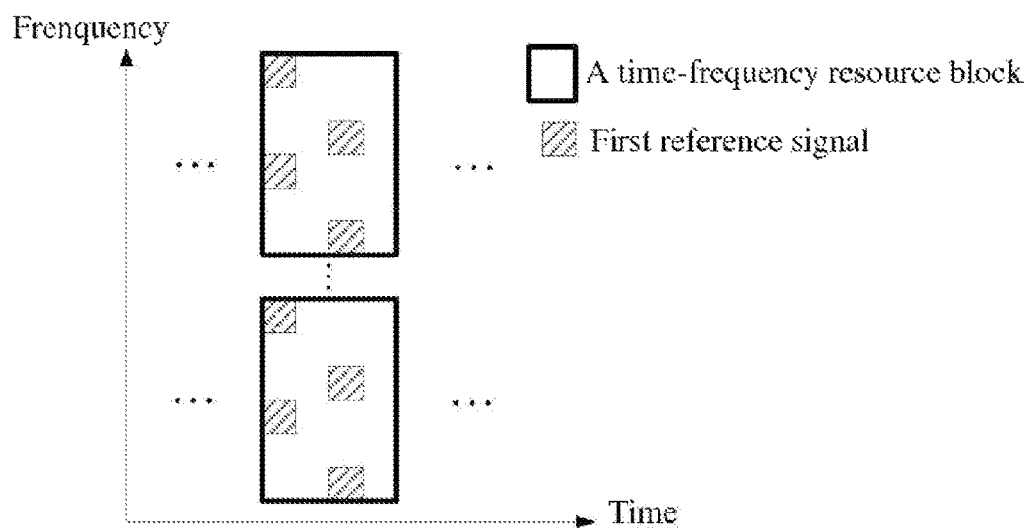
FIG. 25 is a schematic diagram showing resource element occupied by first reference signals in a time-frequency chart according to one embodiment of the present disclosure.

Embodiment 25 illustrates a schematic diagram showing resource element occupied by first reference signals in a time-frequency chart, as shown in FIG. 25.

In embodiment 25, the measurement for the first reference signal is used to determine the first bit block in the present disclosure. In FIG. 25, boxes having thick solid border lines indicate PRBs (Physical Resource Block). The squares filled with oblique lines indicates the REs occupied by the first reference signal.

In one sub-embodiment, the first reference signal comprises CSI-RS.

In one sub-embodiment, when the number of CSI-RS ports included in the first reference signal is not greater than 4, the L in the present disclosure is equal to 2.

In one sub-embodiment, when the number of CSI-RS ports included in the first reference signal is not greater than 4 and the R in the present disclosure is not greater than 2, the L in the present disclosure is equal to 2.

In one sub-embodiment, the measurement for the first reference signal is used to generate information carried by the first bit block.

In one sub-embodiment, the measurement for the first reference signal is used to generate a first channel matrix. The first channel matrix is used to generate the at least first two of the L first vectors in the present disclosure, the R second type parameter group(s) in the present disclosure, the R third type parameter group(s) in the present disclosure, and the R fourth type parameter group(s).

In one sub-embodiment, the measurement for the first reference signal is used to generate a first channel matrix. The first channel matrix is used to generate R first channel vector(s). The R3 combining vector(s) in the present disclosure is(are) respectively quantization value(s) of the R3 first channel vector(s) in the R first channel vector(s).

In one sub-embodiment of the foregoing embodiment, the R first channel vector(s) is(are) used to generate the L first vectors.

In one sub-embodiment of the foregoing embodiment, the R first channel vector(s) is(are) respectively used to generate the R second type parameter group(s).

In one sub-embodiment of the foregoing embodiment, the R first channel vector(s) is(are) respectively used to generate the R third type parameter group(s).

In one sub-embodiment of the foregoing embodiment, the R first channel vector(s) is(are) respectively used to generate the R fourth type parameter group(s).

In one sub-embodiment of the foregoing embodiment, the R first channel vector(s) is(are) R eigenvector(s) of the first channel matrix.

In one reference embodiment of the foregoing sub-embodiment, the R eigenvector(s) respectively corresponds (correspond) to the largest R eigenvalue(s) of the first channel matrix.

In one sub-embodiment, the first channel matrix comprises a small scale of a radio channel experienced by the first reference signal. The small scale fading parameter includes a CIR (Channel Impulse Response).

In one sub-embodiment, the starting time of the time resource occupied by the first reference signal is later than the ending time of the time resource occupied by the first signaling.

In one sub-embodiment, the starting time of the time resource occupied by the first reference signal is earlier than the ending time of the time resource occupied by the first signaling.

Embodiment 26

Figure 26:
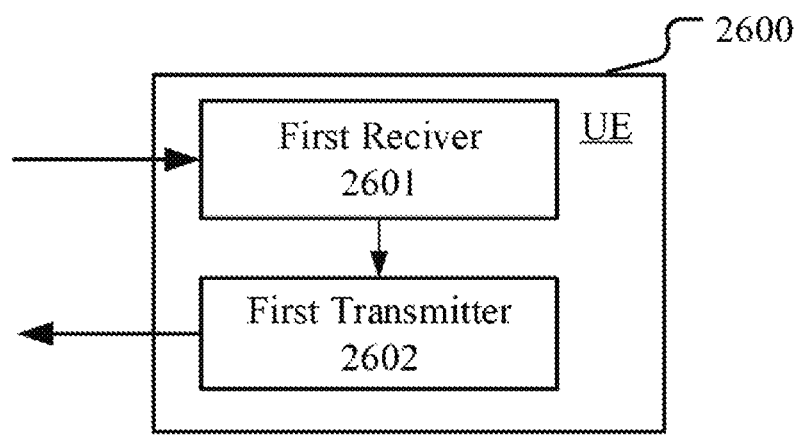
FIG. 26 is a schematic diagram showing the processing device in a user equipment according to one embodiment of the present disclosure.

Embodiment 26 illustrates a schematic diagram showing the processing device in a user equipment, as shown in FIG. 26. In FIG. 26, the processing device 2600 of the user equipment mainly comprises a first receiver 2601 and a first transmitter 2602.

In embodiment 26, the first receiver 2601 receives first information; the first transmitter 2602 transmits the first radio signal. The first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

In one sub-embodiment, the first bit block is used to determine R1 third type parameter subgroup(s); the R1 third type parameter subgroup(s) is(are) respectively a subset (subsets) of R1 third type parameter group(s) in R third type parameter group(s); the R1 is a positive integer not greater than the R; each of the R third type parameter group(s) comprises a positive integer number of third type parameters; each third type parameter of the R third type parameter group(s) corresponds to one second type parameter of the R second type parameter group(s); whether a reference third type parameter belongs to the R1 third type parameter subgroup(s) is associated with at least one of an index of a reference third type parameter group in the R third type parameter group(s) and a magnitude of a second type parameter corresponding to the reference third type parameter; the reference third type parameter is any third type parameter of the R third type parameter group(s); the reference third type parameter group is a third type parameter group comprising the reference third type parameter in the R third type parameter group(s).

In one sub-embodiment, the R third type parameter group(s) and the R second type parameter group(s) are in one-to-one correspondence; a number of third type parameters included in any one of the R third type parameter group(s) is equal to a number of non-zero second type parameters in a corresponding second type parameter group; all the third type parameters in any one of the R third type parameter group(s) and all the non-zero second type parameters in the corresponding second type parameter group are in one-to-one correspondence.

In one sub-embodiment, the first bit block is used to determine R2 fourth type parameter subgroup(s), the R2 fourth type parameter subgroup(s) is(are) respectively a subset(subsets) of R2 fourth type parameter group(s) in R fourth type parameter group(s), the R2 is a positive integer not greater than the R, each of the R fourth type parameter group(s) comprises a positive integer number of fourth type parameters, each fourth type parameter of the R fourth type parameter group(s) corresponds to one second type parameter of the R second type parameter group(s), whether a reference fourth type parameter belongs to the R2 fourth type parameter subgroup(s) is associated with at least one of an index of a reference fourth type parameter group in the R fourth type parameter group(s) and a magnitude of a second type parameter corresponding to the reference fourth type parameter, the reference fourth type parameter is any fourth type parameter of the R fourth type parameter group(s), the reference fourth type parameter group is a fourth type parameter group comprising the reference fourth type parameter in the R fourth type parameter group(s).

In one sub-embodiment, the R fourth type parameter group(s) and the R second type parameter group(s) are in one-to-one correspondence, a number of fourth type parameters included in any one of the R fourth type parameter group(s) is equal to a number of non-zero second type parameters in a corresponding second type parameter group, all the fourth type parameters in any one of the R fourth type parameter group(s) and all the non-zero second type parameters in the corresponding second type parameter group are in one-to-one correspondence.

In one sub-embodiment, the first receiver 2601 receives a first signaling, wherein the first signaling indicates scheduling information of the first radio signal.

In one sub-embodiment, the first receiver 2601 receives a first reference signal, wherein a measurement for the first reference signal is used to determine the first bit block.

In one sub-embodiment, the first receiver 2601 receives a second radio signal, wherein the R3 merge vector is used to generate the second radio signal with the R3 being 1, or some or all of the R3 merge vectors are used to generate the second radio signal with the R3 being larger than 1.

In one sub-embodiment, the first receiver 2601 comprises at least one of {antenna 452, receiver 454, receiving processor 456, multi-antenna receiving processor 458, controller/processor 459, memory 460, data source 467} in embodiment 4.

In one sub-embodiment, the first transmitter 2602 comprises at least one of {antenna 452, transmitter 454, transmitting processor 468, multi-antenna transmitting processor 457, controller/processor 459, memory 460, data source 467} in embodiment 4.

Embodiment 27

Figure 27:
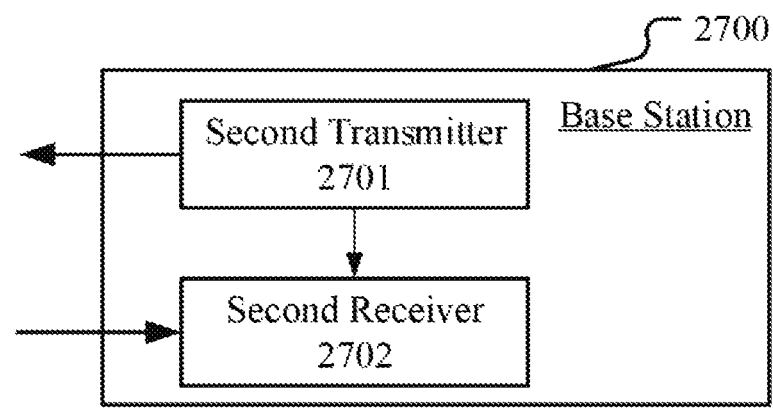
FIG. 27 is a schematic diagram showing the processing device in a base station according to one embodiment of the present disclosure.

Embodiment 27 illustrates a schematic diagram showing the processing device in a base station, as shown in FIG. 27. In FIG. 27, the processing device 2700 of the base station mainly comprises a second transmitter 2701 and a second receiver 2702.

In embodiment 27, the second transmitter 2701 transmits first information; the second receiver 2702 receives a first radio signal. Wherein the first radio signal carries a first bit block, the first bit block being used to determine R, L first vectors and R second type parameter group(s); the R is used to determine the L from P candidate integers; the first information is used to determine the P candidate integers; each second type parameter group of the R second type parameter group(s) comprises L2 second type parameters, the L2 being equal to the L multiplied by 2; R3 second type parameter group(s) in the R second type parameter group(s) is(are) respectively used with the L first vectors to generate R3 merge vector(s); the P is a positive integer greater than 1; the R is a positive integer; the R3 is a positive integer not greater than the R; the P candidate integers are positive integers greater than 1.

In one sub-embodiment, the first bit block is used to determine R1 third type parameter subgroup(s); the R1 third type parameter subgroup(s) is(are) respectively a subset (subsets) of R1 third type parameter group(s) in R third type parameter group(s); the R1 is a positive integer not greater than the R; each of the R third type parameter group(s) comprises a positive integer number of third type parameters; each third type parameter of the R third type parameter group(s) corresponds to one second type parameter of the R second type parameter group(s); whether a reference third type parameter belongs to the R1 third type parameter subgroup(s) is associated with at least one of an index of a reference third type parameter group in the R third type parameter group(s) and a magnitude of a second type parameter corresponding to the reference third type parameter; the reference third type parameter is any third type parameter of the R third type parameter group(s); the reference third type parameter group is a third type parameter group comprising the reference third type parameter in the R third type parameter group(s).

In one sub-embodiment, the R third type parameter group(s) and the R second type parameter group(s) are in one-to-one correspondence; a number of third type parameters included in any one of the R third type parameter group(s) is equal to a number of non-zero second type parameters in a corresponding second type parameter group; all the third type parameters in any one of the R third type parameter group(s) and all the non-zero second type parameters in the corresponding second type parameter group are in one-to-one correspondence.

In one sub-embodiment, the first bit block is used to determine R2 fourth type parameter subgroup(s), the R2 fourth type parameter subgroup(s) is(are) respectively a subset(subsets) of R2 fourth type parameter group(s) in R fourth type parameter group(s), the R2 is a positive integer not greater than the R, each of the R fourth type parameter group(s) comprises a positive integer number of fourth type parameters, each fourth type parameter of the R fourth type parameter group(s) corresponds to one second type parameter of the R second type parameter group(s), whether a reference fourth type parameter belongs to the R2 fourth type parameter subgroup(s) is associated with at least one of an index of a reference fourth type parameter group in the R fourth type parameter group(s) and a magnitude of a second type parameter corresponding to the reference fourth type parameter, the reference fourth type parameter is any fourth type parameter of the R fourth type parameter group(s), the reference fourth type parameter group is a fourth type parameter group comprising the reference fourth type parameter in the R fourth type parameter group(s).

In one sub-embodiment, the R fourth type parameter group(s) and the R second type parameter group(s) are in one-to-one correspondence, a number of fourth type parameters included in any one of the R fourth type parameter group(s) is equal to a number of non-zero second type parameters in a corresponding second type parameter group, all the fourth type parameters in any one of the R fourth type parameter group(s) and all the non-zero second type parameters in the corresponding second type parameter group are in one-to-one correspondence.

In one sub-embodiment, the second transmitter 2701 transmits a first signaling, wherein the first signaling indicates scheduling information of the first radio signal.

In one sub-embodiment, the second transmitter 2701 transmits a first reference signal, wherein a measurement for the first reference signal is used to determine the first bit block.

In one sub-embodiment, the second transmitter 2701 transmits a second radio signal, wherein the R3 merge vector is used to generate the second radio signal with the R3 being 1, or some or all of the R3 merge vectors are used to generate the second radio signal with the R3 being larger than 1.

In one sub-embodiment, the second transmitter 2701 includes at least one of {antenna 420, transmitter 418, transmitting processor 416, multi-antenna transmitting processor 471, controller/processor 475, memory 476} in embodiment 4.

In one sub-embodiment, the second receiver 2702 includes at least one of {antenna 420, receiver 418, receiving processor 470, multi-antenna receiving processor 472, controller/processor 475, memory 476} in embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, radio sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method for wireless communication in a user equipment (UE), comprising:
receiving first information; and
transmitting a first radio signal;
wherein:
the first radio signal carries a first bit block, the first bit block being used to determine R, L first vectors, and at least one second type parameter group, wherein a number of second type parameter groups in the at least one second type parameter group is R;
the R is used to determine the L from P candidate integers;
the first information is used to determine the P candidate integers;
each second type parameter group of the at least one second type parameter group comprises L2 second type parameters, the L2 being equal to the L multiplied by 2;
R3 second type parameter group/groups in the at least one second type parameter group are used with the L first vectors to generate R3 merge vector/vectors;
the P is a positive integer greater than 1;
the R is a positive integer;
the R3 is equal to 1;
the P candidate integers are positive integers greater than 1;
the first bit block carries CSI (Channel State Information);
the R is indicated by RI (Rank Indicator);
the P is equal to 2;
the L first vectors are indicated by PMI (Precoding Matrix Indicator); and
the at least one second type parameter group is indicated by PMI.

2. The method of claim 1, wherein:
the first bit block is used to determine at least one third type parameter subgroup;
a number of third type parameter subgroups in the at least one third type parameter subgroup is R;
the at least one third type parameter subgroup and at least one third type parameter group are in one-to-one correspondence, each of the at least one third type parameter subgroup is a subset of a corresponding third type parameter group of the at least one third type parameter group, and a number of third type parameter groups in the at least one third type parameter group is R;
each of the at least one third type parameter group comprises a positive integer number of third type parameters;
each third type parameter of the at least one third type parameter group corresponds to one second type parameter of the at least one second type parameter group;
whether a reference third type parameter belongs to the at least one third type parameter subgroup or not is associated with at least one of an index of a reference third type parameter group in the at least one third type parameter group and a magnitude of a second type parameter corresponding to the reference third type parameter;
the reference third type parameter is any third type parameter of the at least one third type parameter group;
the reference third type parameter group is a third type parameter group comprising the reference third type parameter in the at least one third type parameter group;
the first bit block is irrelevant to any third type parameter of the at least one third type parameter group which does not belong to the at least one third type parameter subgroup; and
the at least one third type parameter group is indicated by PMI.

3. The method of claim 2, wherein:
only R3 third type parameter subgroup of the at least one third type parameter subgroup is used to generate the R3 merge vector;
the R3 merge vector is concatenated by a first merge vector and a second merge vector;
the first merge vector is generated by adding the L first vectors after being weighed respectively by L first combining coefficients, and the second merge vector is generated by adding the L first vectors after being weighted respectively by L second combining coefficients;
the L first combining coefficients and first L second type parameters in the R3 second type parameter group are in one-to-one correspondence, and the L second combining coefficients and last L second type parameters in the R3 second type parameter group are in one-to-one correspondence;
L3 third type parameters in the R3 third type parameter subgroup correspond to L3 non-zero second type parameters in the first L second type parameters in the R3 second type parameter group, respectively;
L4 third type parameters in the R3 third type parameter subgroup correspond to L4 non-zero second type parameters in the last L second type parameters in the R3 second type parameter group, respectively;
the L3 and the L4 are positive integers;
the sum of the L3 and the L4 is equal to the number of third type parameters included in the R3 third type parameter subgroup;
L3 first combining coefficients in the L first combining coefficients respectively corresponding to the L3 non-zero second type parameters are respectively equal to products of the L3 non-zero second type parameters and the L3 third type parameters and
L4 second combining coefficients in the L second combining coefficients respectively corresponding to the L4 non-zero second type parameters are respectively equal to products of the L4 non-zero second type parameters and the L4 third type parameters.

4. The method of claim 2, wherein:
the at least one third type parameter group and the at least one second type parameter group are in one-to-one correspondence;
a number of third type parameters included in any one of the at least one third type parameter group is equal to a number of non-zero second type parameters in a corresponding second type parameter group; and
all the third type parameters in any one of the at least one third type parameter group and all the non-zero second type parameters in the corresponding second type parameter group are in one-to-one correspondence.

5. The method of claim 1, further comprising:
receiving a first signaling, wherein the first signaling indicates scheduling information of the first radio signal; or
receiving a first reference signal, wherein a measurement for the first reference signal is used to determine the first bit block; or
receiving a second radio signal, wherein the R3 merge vector is used by a transmitter of the second radio signal to generate the second radio signal.

6. A method for wireless communication in a base station, comprising:
transmitting first information; and
receiving a first radio signal;
wherein:
the first radio signal carries a first bit block, the first bit block being used to determine R, L first vectors and at least one second type parameter group, wherein a number of second type parameter groups in the at least one second type parameter group is R;
the R is used to determine the L from P candidate integers;
the first information is used to determine the P candidate integers;
each second type parameter group of the at least one second type parameter group comprises L2 second type parameters, the L2 being equal to the L multiplied by 2;
R3 second type parameter group in the at least one second type parameter group is used with the L first vectors to generate R3 merge vector;
the P is a positive integer greater than 1;
the R is a positive integer;
the R3 is equal to 1;
the P candidate integers are positive integers greater than 1;
the first bit block carries CSI (Channel State Information);
the R is indicated by RI (Rank Indicator);
the P is equal to 2;
the L first vectors are indicated by PMI (Precoding Matrix Indicator); and
the at least one second type parameter group is indicated by PMI.

7. The method of claim 6, wherein:
the first bit block is used to determine at least one third type parameter subgroup, and a number of third type parameter subgroups in the at least one third type parameter subgroup is R;
the at least one third type parameter subgroup and at least one third type parameter group are in one-to-one correspondence, each of the at least one third type parameter subgroup is a subset of a corresponding third type parameter group of the at least one third type parameter group, and a number of third type parameter groups in the at least one third type parameter group is R;
each of the at least one third type parameter group comprises a positive integer number of third type parameters;
each third type parameter of the at least one third type parameter group corresponds to one second type parameter of the at least one second type parameter group;
whether a reference third type parameter belongs to the at least one third type parameter subgroup or not is associated with at least one of an index of a reference third type parameter group in the at least one third type parameter group and a magnitude of a second type parameter corresponding to the reference third type parameter;
the reference third type parameter is any third type parameter of the at least one third type parameter group;
the reference third type parameter group is a third type parameter group comprising the reference third type parameter in the at least one third type parameter group;
the first bit block is irrelevant to any third type parameter of the at least one third type parameter group which does not belong to the at least one third type parameter subgroup; and
the at least one third type parameter group is indicated by PMI.

8. The method of claim 7, wherein:
only R3 third type parameter subgroup of the at least one third type parameter subgroup is used to generate the R3 merge vector;
the R3 merge vector is concatenated by a first merge vector and a second merge vector;
the first merge vector is generated by adding the L first vectors after weighed respectively by L first combining coefficients;
the second merge vector is generated by adding the L first vectors after weighted respectively by L second combining coefficients;
the L first combining coefficients and first L second type parameters in the R3 second type parameter group are in one-to-one correspondence;
the L second combining coefficients and last L second type parameters in the R3 second type parameter group are in one-to-one correspondence;
L3 third type parameters in the R3 third type parameter subgroup correspond to L3 non-zero second type parameters in the first L second type parameters in the R3 second type parameter group, respectively;
L4 third type parameters in the R3 third type parameter subgroup correspond to L4 non-zero second type parameters in the last L second type parameters in the R3 second type parameter group, respectively;
the L3 and the L4 are positive integers;
the sum of the L3 and the L4 is equal to the number of third type parameters included in the R3 third type parameter subgroup; and
L3 first combining coefficients in the L first combining coefficients respectively corresponding to the L3 non-zero second type parameters are respectively equal to products of the L3 non-zero second type parameters and the L3 third type parameters; and
L4 second combining coefficients in the L second combining coefficients respectively corresponding to the L4 non-zero second type parameters are respectively equal to products of the L4 non-zero second type parameters and the L4 third type parameters.

9. The method of claim 7, wherein:
the at least one third type parameter group and the at least one second type parameter group are in one-to-one correspondence;
a number of third type parameters included in any one of the at least one third type parameter group is equal to a number of non-zero second type parameters in a corresponding second type parameter group; and all the third type parameters in any one of the at least one third type parameter group and all the non-zero second type parameters in the corresponding second type parameter group are in one-to-one correspondence.

10. The method of claim 6, further comprising:
transmitting a first signaling, wherein the first signaling indicates scheduling information of the first radio signal; or
transmitting a first reference signal, wherein a measurement for the first reference signal is used to determine the first bit block; or
transmitting a second radio signal, wherein the R3 merge vector is used to generate the second radio signal.

11. A user equipment (UE) for wireless communication, comprising:
a first receiver, receiving first information; and
a first transmitter, transmitting a first radio signal;
wherein:
the first radio signal carries a first bit block, the first bit block being used to determine R, L first vectors and at least one second type parameter group, and a number of second type parameter groups in the at least one second type parameter group is R;
the R is used to determine the L from P candidate integers;
the first information is used to determine the P candidate integers;
each second type parameter group of the at least one second type parameter group comprises L2 second type parameters, the L2 being equal to the L multiplied by 2;
R3 second type parameter group in the at least one second type parameter group is used with the L first vectors to generate R3 merge vector/vectors;
the P is a positive integer greater than 1;
the R is a positive integer;
the R3 is equal to 1;
the P candidate integers are positive integers greater than 1;
the first bit block carries CSI (Channel State Information);
the R is indicated by RI (Rank Indicator);
the P is equal to 2;
the L first vectors are indicated by PMI (Precoding Matrix Indicator); and
the at least one second type parameter group is indicated by PMI.

12. The user equipment of claim 11, wherein:
the first bit block is used to determine at least one third type parameter subgroup, and a number of third type parameter subgroups in the at least one third type parameter subgroup is R;
the at least one third type parameter subgroup and at least one third type parameter group are in one-to-one correspondence, each of the at least one third type parameter subgroup is a subset of a corresponding third type parameter group of the at least one third type parameter group, and a number of third type parameter groups in the at least one third type parameter group is R;
each of the at least one third type parameter group comprises a positive integer number of third type parameters;
each third type parameter of the at least one third type parameter group corresponds to one second type parameter of the at least one second type parameter group;

whether a reference third type parameter belongs to the at least one third type parameter subgroup or not is associated with at least one of an index of a reference third type parameter group in the at least one third type parameter group and a magnitude of a second type parameter corresponding to the reference third type parameter;
the reference third type parameter is any third type parameter of the at least one third type parameter group;
the reference third type parameter group is a third type parameter group comprising the reference third type parameter in the at least one third type parameter group;
the first bit block is irrelevant to any third type parameter of the at least one third type parameter group which does not belong to the at least one third type parameter subgroup; and
the at least one third type parameter group is indicated by PMI.

13. The method of claim 12, wherein:
only R3 third type parameter subgroup of the at least one third type parameter subgroup is used to generate the R3 merge vector;
the R3 merge vector is concatenated by a first merge vector and a second merge vector;
the first merge vector is generated by adding the L first vectors after weighed respectively by L first combining coefficients;
the second merge vector is generated by adding the L first vectors after weighted respectively by L second combining coefficients;
the L first combining coefficients and first L second type parameters in the R3 second type parameter group are in one-to-one correspondence;
the L second combining coefficients and last L second type parameters in the R3 second type parameter group are in one-to-one correspondence;
L3 third type parameters in the R3 third type parameter subgroup correspond to L3 non-zero second type parameters in the first L second type parameters in the R3 second type parameter group, respectively
L4 third type parameters in the R3 third type parameter subgroup correspond to L4 non-zero second type parameters in the last L second type parameters in the R3 second type parameter group, respectively;
the L3 and the L4 are positive integers;
the sum of the L3 and the L4 is equal to the number of third type parameters included in the R3 third type parameter subgroup;
L3 first combining coefficients in the L first combining coefficients respectively corresponding to the L3 non-zero second type parameters are respectively equal to products of the L3 non-zero second type parameters and the L3 third type parameters; and
L4 second combining coefficients in the L second combining coefficients respectively corresponding to the L4 non-zero second type parameters are respectively equal to products of the L4 non-zero second type parameters and the L4 third type parameters.

14. The user equipment of claim 12, wherein:
the at least one third type parameter group and the at least one second type parameter group are in one-to-one correspondence;
a number-of third type parameters included in any one of the at least one third type parameter group is equal to a number of non-zero second type parameters in a corresponding second type parameter group; and all the third type parameters in any one of the at least one third type parameter group and all the non-zero second type parameters in the corresponding second type parameter group are in one-to-one correspondence.

15. The user equipment of claim 11, wherein:

the first receiver receives a first signaling, wherein the first signaling indicates scheduling information of the first radio signal; or the first receiver receives a first reference signal, wherein a measurement for the first reference signal is used to determine the first bit block; or the first receiver receives a second radio signal, wherein the R3 merge vector is used by a transmitter of the second radio signal to generate the second radio signal.

16. A base station for wireless communication, comprising:

a second transmitter, transmitting first information; and a second receiver, receiving a first radio signal;

wherein:

the first radio signal carries a first bit block, the first bit block being used to determine R, L first vectors and at least one second type parameter group, and a number of second type parameter groups in the at least one second type parameter group is R;

the R is used to determine the L from P candidate integers;

the first information is used to determine the P candidate integers;

each second type parameter group of the at least one second type parameter group comprises L2 second type parameters, the L2 being equal to the L multiplied by 2;

R3 second type parameter group/groups in the at least one second type parameter group is used with the L first vectors to generate R3 merge vector/vectors;

the P is a positive integer greater than 1;

the R is a positive integer;

the R3 is equal to 1;

the P candidate integers are positive integers greater than 1;

the first bit block carries CSI (Channel State Information);

the R is indicated by RI (Rank Indicator);

the P is equal to 2;

the L first vectors are indicated by PMI (Precoding Matrix Indicator); and the at least one second type parameter group is indicated by PMI.

17. The base station of claim 16, wherein:

the first bit block is used to determine at least one third type parameter subgroup, and a number of third type parameter subgroups in the at least one third type parameter subgroup is R;

the at least one third type parameter subgroup and at least one third type parameter group are in one-to-one correspondence, each of the at least one third type parameter subgroup is a subset of a corresponding third type parameter group of the at least one third type parameter group, and a number of third type parameter groups in the at least one third type parameter group is R;

each of the at least one third type parameter group comprises a positive integer number of third type parameters;

each third type parameter of the at least one third type parameter group corresponds to one second type parameter of the at least one second type parameter group;

whether a reference third type parameter belongs to the at least one third type parameter subgroup or not is associated with at least one of an index of a reference third type parameter group in the at least one third type parameter group and a magnitude of a second type parameter corresponding to the reference third type parameter;

the reference third type parameter is any third type parameter of the at least one third type parameter group;

the reference third type parameter group is a third type parameter group comprising the reference third type parameter in the at least one third type parameter group;

the first bit block is irrelevant to any third type parameter of the at least one third type parameter group which does not belong to the at least one third type parameter subgroup; and the at least one third type parameter group is indicated by PMI.

18. The method of claim 17, wherein:

only R3 third type parameter subgroup of the at least one third type parameter subgroup is used to generate the R3 merge vector;

the R3 merge vector is concatenated by a first merge vector and a second merge vector;

the first merge vector is generated by adding the L first vectors after weighed respectively by L first combining coefficients;

the second merge vector is generated by adding the L first vectors after weighted respectively by L second combining coefficients;

the L first combining coefficients and first L second type parameters in the R3 second type parameter group are in one-to-one correspondence;

the L second combining coefficients and last L second type parameters in the R3 second type parameter group are in one-to-one correspondence;

L3 third type parameters in the R3 third type parameter subgroup correspond to L3 non-zero second type parameters in the first L second type parameters in the R3 second type parameter group, respectively;

L4 third type parameters in the R3 third type parameter subgroup correspond to L4 non-zero second type parameters in the last L second type parameters in the R3 second type parameter group, respectively;

the L3 and the L4 are positive integers;

the sum of the L3 and the L4 is equal to the number of third type parameters included in the R3 third type parameter subgroup;

L3 first combining coefficients in the L first combining coefficients respectively corresponding to the L3 non-zero second type parameters are respectively equal to products of the L3 non-zero second type parameters and the L3 third type parameters; and L4 second combining coefficients in the L second combining coefficients respectively corresponding to the L4 non-zero second type parameters are respectively equal to products of the L4 non-zero second type parameters and the L4 third type parameters.

19. The base station of claim 17, wherein:

the at least one third type parameter group and the at least one second type parameter group are in one-to-one correspondence;

a number of third type parameters included in any one of the at least one third type parameter group is equal to a number of non-zero second type parameters in a corresponding second type parameter group; and all the third type parameters in any one of the at least one third type parameter group and all the non-zero second type parameters in the corresponding second type parameter group are in one-to-one correspondence.

20. The base station of claim 16, wherein:

the second transmitter transmits a first signaling, wherein the first signaling indicates scheduling information of the first radio signal; or the second transmitter transmits a first reference signal, wherein a measurement for the first reference signal is used to determine the first bit block; or the second transmitter transmits a second radio signal, wherein the R3 merge vector is used to generate the second radio signal.

\* \* \* \* \*